(12) United States Patent
Warren

(10) Patent No.: US 10,332,415 B2
(45) Date of Patent: Jun. 25, 2019

(54) SYSTEM AND METHOD OF TEACHING MUSIC

(71) Applicant: Scott Anthony Warren, North Hollywood, CA (US)

(72) Inventor: Scott Anthony Warren, North Hollywood, CA (US)

(*) Notice: Subject to any disclaimer, the term of this patent is extended or adjusted under 35 U.S.C. 154(b) by 0 days.

(21) Appl. No.: 15/819,815

(22) Filed: Nov. 21, 2017

(65) Prior Publication Data

US 2018/0218635 A1    Aug. 2, 2018

Related U.S. Application Data

(60) Provisional application No. 62/424,945, filed on Nov. 21, 2016.

(51) Int. Cl.
*G09B 15/02* (2006.01)
*G09B 5/06* (2006.01)

(52) U.S. Cl.
CPC ............. *G09B 15/023* (2013.01); *G09B 5/06* (2013.01)

(58) Field of Classification Search
CPC ............................... G09B 15/023; G09B 5/06
USPC ............................................. 84/470 R, 471 R
See application file for complete search history.

(56) References Cited

U.S. PATENT DOCUMENTS

| | | | | |
|---|---|---|---|---|
| 1,450,395 A * | 4/1923 | Troidl | .................... | G09B 19/02 434/207 |
| 2,231,020 A * | 2/1941 | McCaulley | .......... | G09B 15/004 273/301 |
| 3,700,785 A * | 10/1972 | Leonard | ................. | G09B 15/02 84/470 R |
| 7,732,695 B1 * | 6/2010 | Sanderson | ............. | G09B 15/00 84/470 R |

* cited by examiner

*Primary Examiner* — Jeffrey Donels

(57) ABSTRACT

A set of teaching methods and system for implementing such teaching methods is disclosed for helping a music student learn how become more familiar with a keyboard and music in general. A set of drills and exercises are presented which will increase a student's musical ability far faster than can be achieved by traditional teaching methods. In addition, a set of humorous characters Moreover, a system is presented which will allow implementation of these exercises.

12 Claims, 34 Drawing Sheets

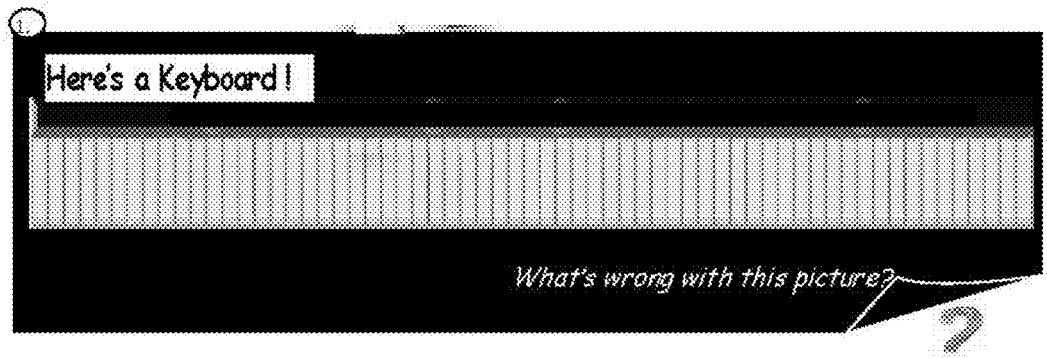
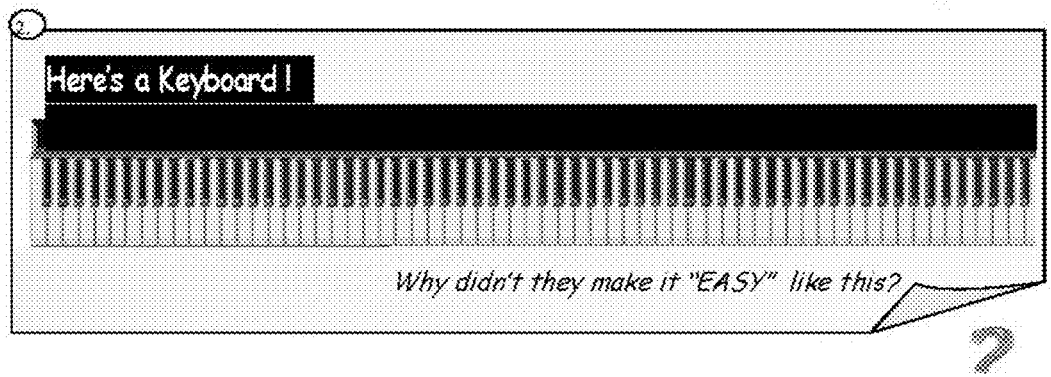
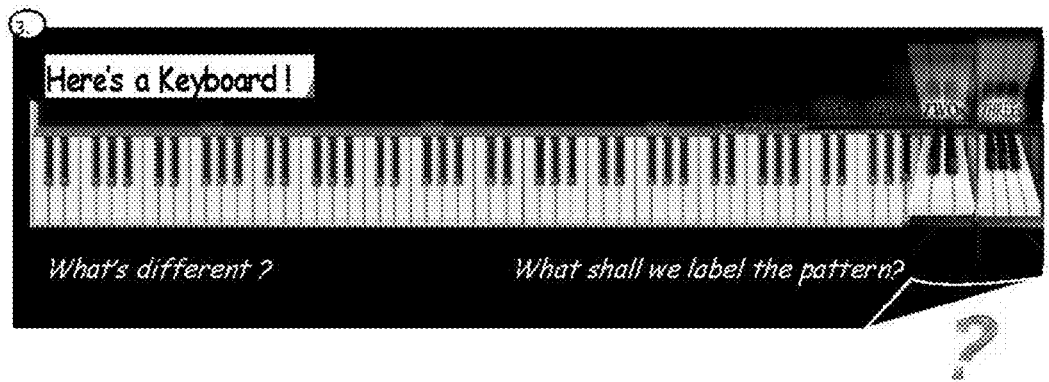
Fig. 1

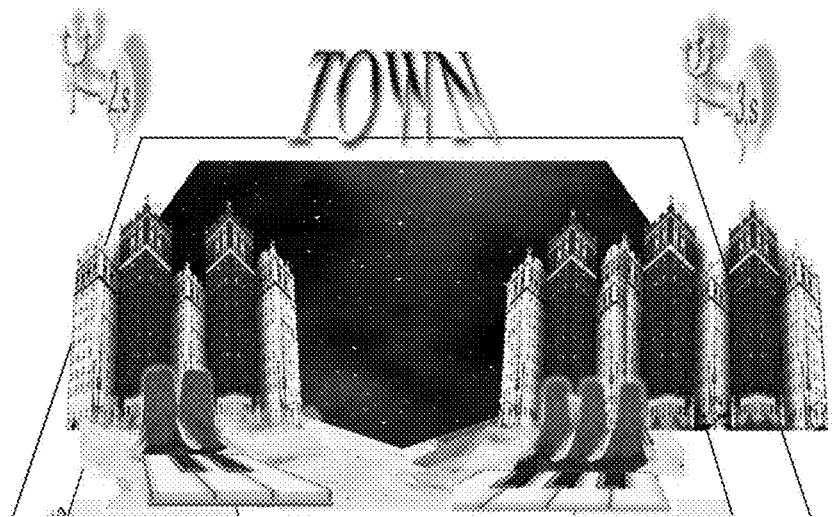
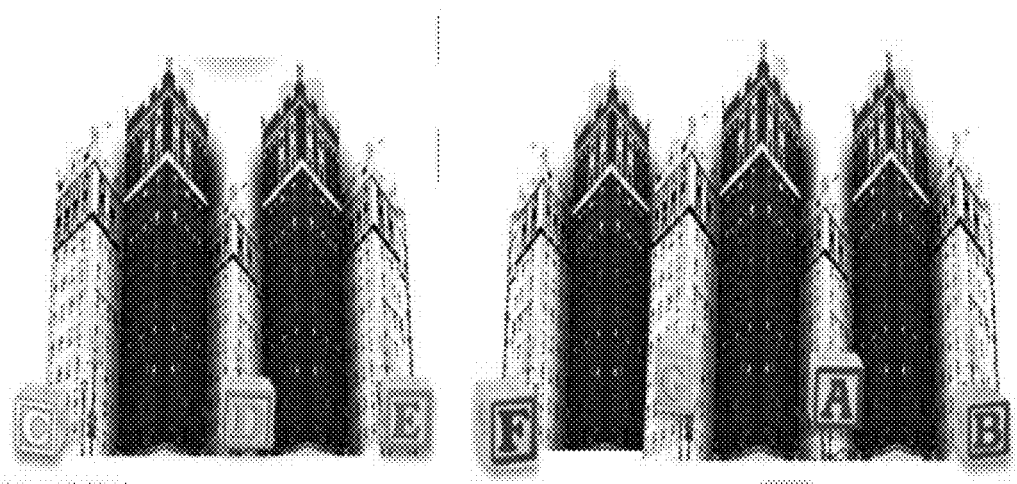
"C, be-low the Twos"
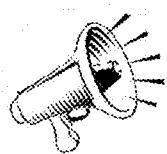
"D, be-tween the Twos"
"E, a-bove the Twos"
(etc.)
Fig. 5

A. 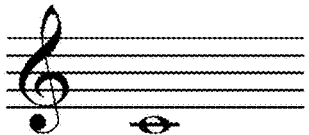
Staff: Template on which music is written.
B. 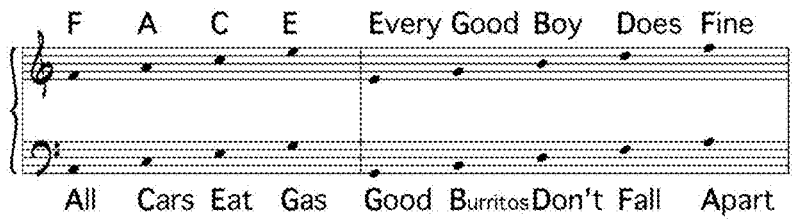
Traditional Staff mnemonics: *(Ascending)*
C. 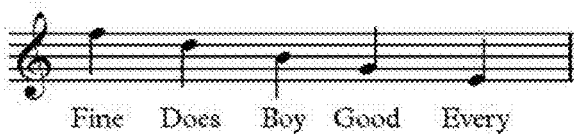
Staff mnemonics: *(Descending)-"impractical"*.
D. 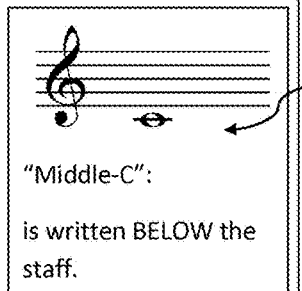
"Middle-C":
is written BELOW the staff.
E. 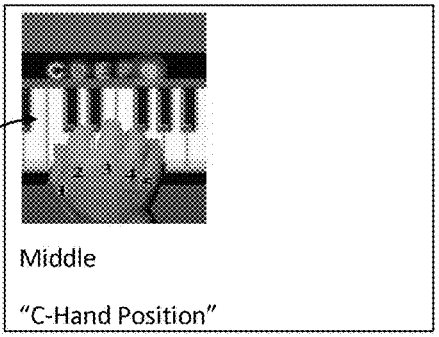
Middle
"C-Hand Position"
Fig. 14

BLACK-KEY-Scales:

Chord Shapes-2
Misfits
B 
Bb 
F# 
Fig. 27

Chord Shapes-3: *minor*
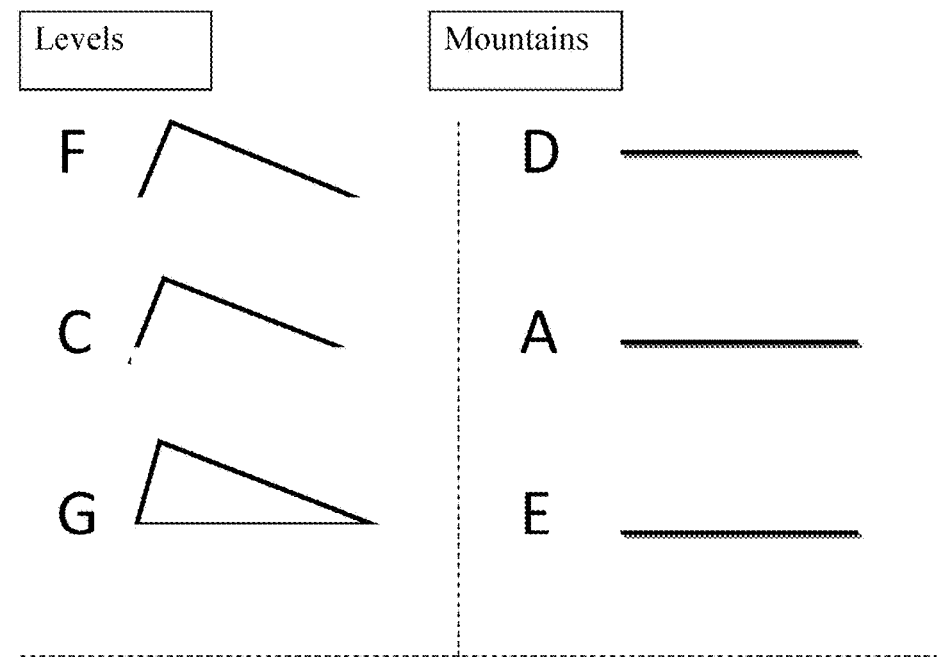
Fig. 28

Chord Shapes-3: *minor*
Misfits
B 
A#  Bb
D#  Eb
Fig. 29

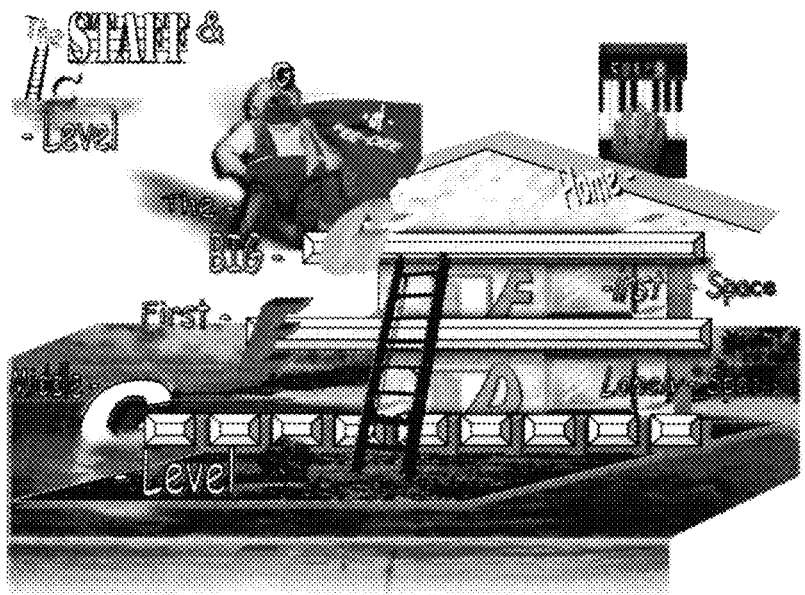
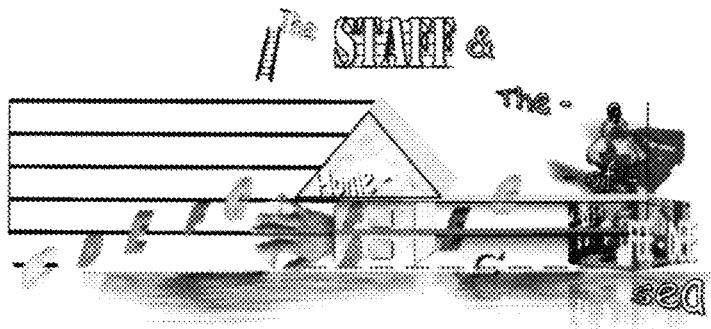
Fig. 32

PLAY-BY-NUMBERS GAMES
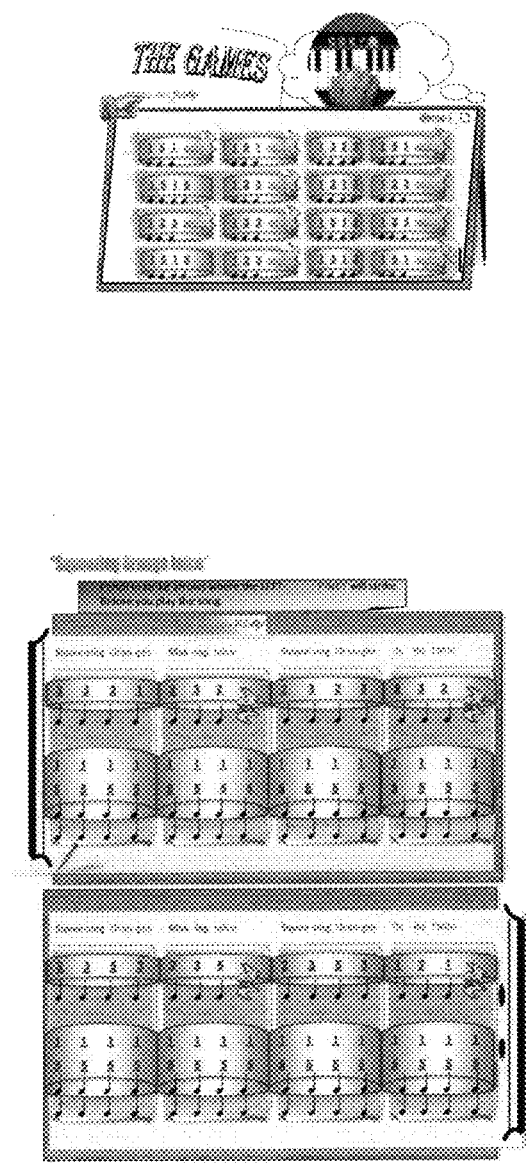
Fig. 33

"Eee-Gee-Bee-Dee-Eff"
Hand Staff Games: Treble-Lines

Scott Warren 2014

Fig. 34

SYSTEM AND METHOD OF TEACHING MUSIC

CROSS-REFERENCE TO RELATED APPLICATION

This patent claims the benefit of U.S. Provisional Patent Application No. 62424945, filed Nov. 21, 2016, entitled "METHOD OF TEACHING A STUDENT HOW TO PLAY THE PIANO," which is incorporated by reference herein.

FIELD OF THE INVENTION

The present invention relates to the field of music, particularly learning to play music by ear and by sight.

BACKGROUND

The current state of the art with respect to teaching of music involves a teacher teaching a student the seven different letter names of the musical notes. Teaching such notes in isolation as has been done since the days of Mozart results in a lack of structure which causes confusion and frustration for the student because of the difficulty of identifying the various keys, among other things. Students often find themselves wondering why they are being taught these mismatched techniques. In addition, several questions are raised by such a teaching method. How is the student going to apply themselves to achieve the ability to recognize the keys? Are they to spend hours at the piano practicing naming keys? How does one attack this methodically? This lack of structure sends the student home with a vague assignment resulting in further frustration.

Furthermore, when the student returns the following week, how will the teacher evaluate the student's command of the previous lesson? An established method for evaluating a student's direct ability to recognize the white keys does not currently exist. There are such devices as keyboard picture challenges in which the student will have written the letter-names on the picture, but this does not require immediate recall. Therefore, this ability is often assumed and/or overlooked by the teacher because, from the teacher's point of view, the white key names are obvious. A qualified piano teacher will be aware of this and thus determine their own method of testing the student's recall by simply requesting them to find a specific key and play it in reaction to its letter name. However, even a highly skilled teacher could potentially be unaware of the mental processes the student is performing in order to arrive at the desired answer. Typically the student will have understand that the white keys are in alphabetical order. Therefore, the typical process a student would perform is to "count up from the one that you know." While this process does achieve the desired result of identifying the appropriate key, it does so in a manner which does not allow a student to efficiently identify a particular key and it certainly does not do them much good when they are trying to play a song. Moreover, a teacher cannot determine whether or not the student is performing these processes in order to arrive at a correct key identification.

Moreover, the first piano lesson traditionally involves the staff, which is the set of five horizontal lines and four spaces between them, each of which represent a different musical pitch. The traditional method for memorizing the lines of a staff is difficult and non-intuitive, and is always a point of confusion for piano and music students in general. Traditionally, students have dealt with this issue by way of a mnemonic. There is not likely not an English speaking human who hasn't heard the phrase "Every Good Boy Does Fine." This phrase attempts to define the treble clef staff lines because each line starts with the first letter of each word. However, when presented to a beginning student, that is often not explained. In addition, in order to translate the sentence to labels of the staff, a student must discard the portion of the words after the first letter. Lastly, where the mnemonic really breaks down, is when music is descending, which it does roughly half of the time. Further still, because of tradition, these mnemonic phrases are very frequently presented to a student at a very early stage of musical education. At the same time, they are very rarely applied until much later in one's musical education. This is the way that music has been taught to new students for centuries.

In summary, the present state of the art consists of an inconsistent and mismatched set of tools which can often leave a student frustrated, confused, and uninterested in learning music. The disclosed methods consider these techniques to be unnecessary and outdated and seek to replace them.

The approaches described in this section are approaches that could be pursued but are not necessarily approaches that have been previously conceived or pursued. Therefore, unless otherwise indicated, it should not be assumed that any of the approaches described in this section qualifies as prior art merely by virtue of inclusion in this section.

BRIEF SUMMARY OF THE INVENTION

The present invention is comprised of a related set of concepts, lessons, and drills which would be performed by a student who desires to learn to play music in a more proficient manner.

A number of exemplary embodiments of the present invention are provided for teaching a student to become more proficient in their ability to play music. Such exemplary embodiments are not in any way to be deemed restrictions or limitations on embodiments of the present invention.

BRIEF DESCRIPTION OF THE DRAWINGS

The present invention is illustrated by way of example, and not by way of limitation, in the figures of the accompanying drawings in which like reference numerals refer to similar elements and in which:

FIG. 1 depicts a number of examples of how a keyboard could have been constructed and constrasts them with the pattern that is established today.

FIG. 5 depicts a way of hyperbolically representing the peaks and valleys of the keys of a keyboard as well as a way of remembering the keys surrounding the sections of black keys.

FIG. 14A depicts the treble staff. FIG. 14B depicts the traditional staff mnemonics that have been traditionally used. FIG. 14C shows the nonsensical result of using such silly mnemonics. FIG. 14D further demonstrates how these mnemonics fail. FIG. 14E shows the hand position of middle C on the keyboard and how it doesn't match the mnemonics.

FIG. 27 depicts some of the other major chords grouped by the shapes that the black keys cause them to make.

FIG. 28 depicts some of the minor chords grouped by the shapes that the black keys cause them to make.

FIG. 29 depicts some of other minor chords grouped by the shapes that the black keys cause them to make.

FIG. 32 depicts a cartoon which is designed to cause you to recite the musical alphabet backwards.

FIG. 33 depicts an application of we are twos and we are threes to the pentatonic scale to produce a blues song.

FIG. 34 depicts a game designed to challenge fast comprehension of notes on a staff displayed according to lines or spaces.

Figure 2:
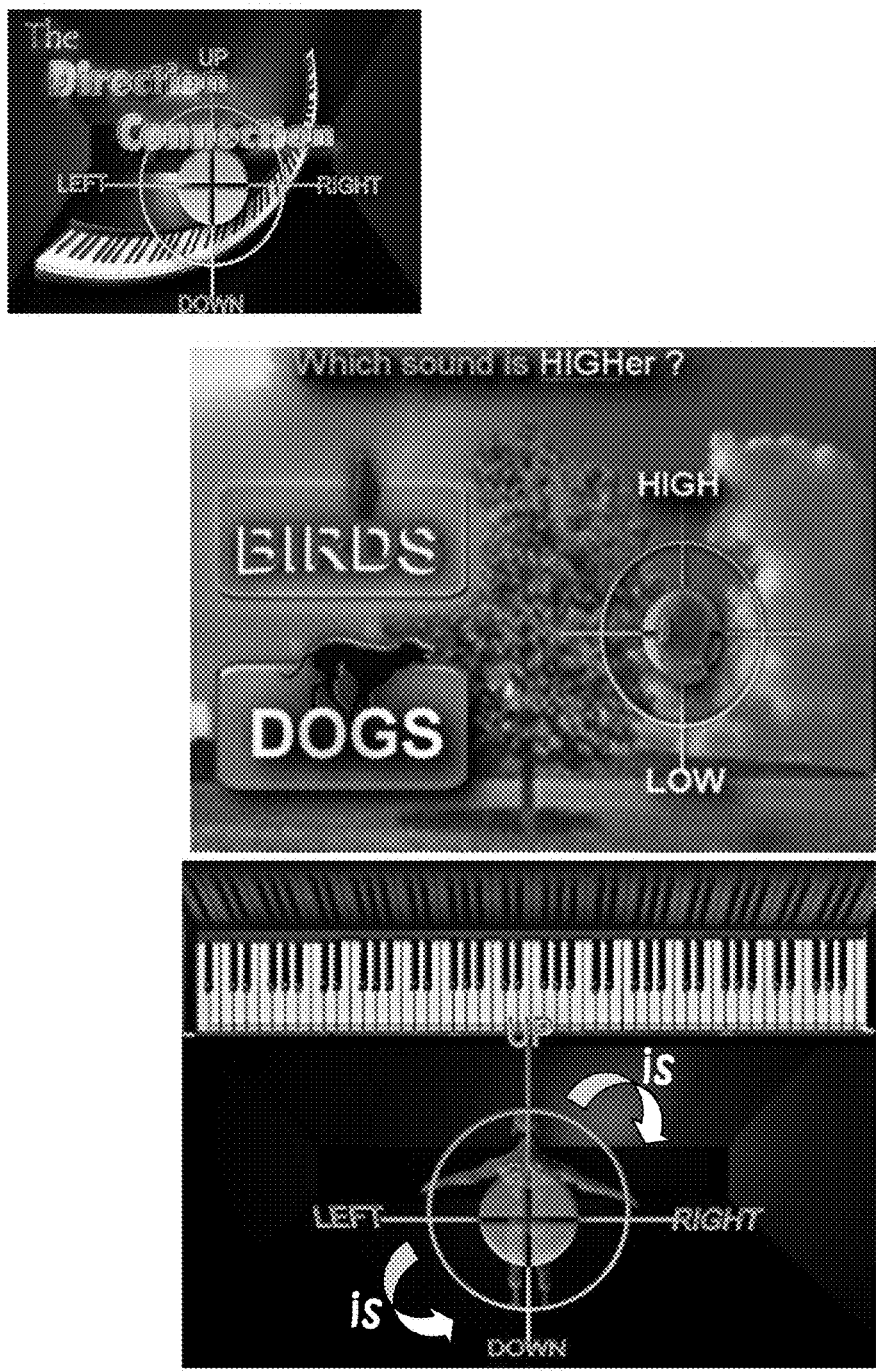
FIG. 2 depicts a number of thought exercises which show how the concept of direction is applied to music.
Figure 3:
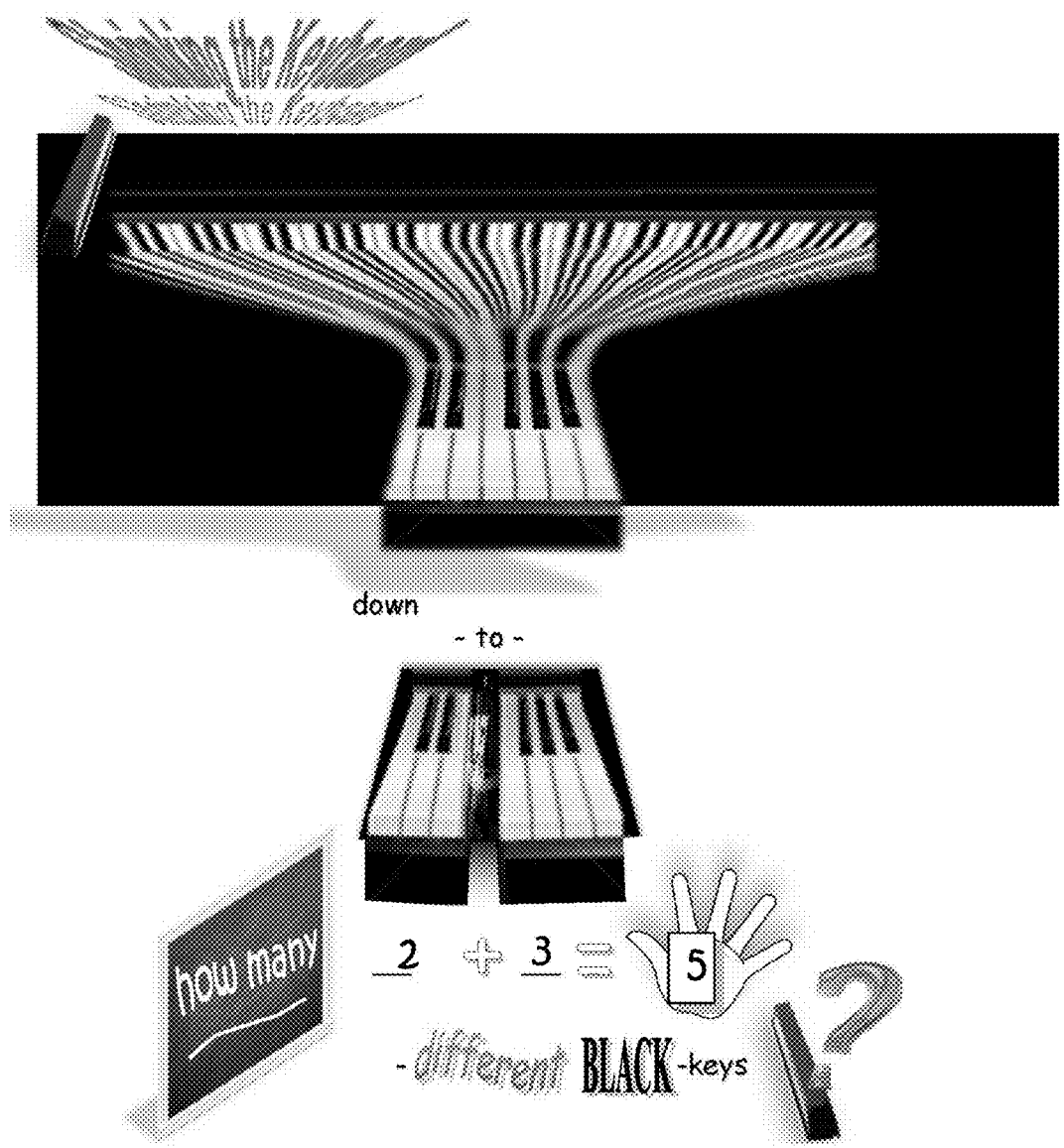
FIG. 3 depicts how a keyboard can be correlated with a repeating pattern instead of one long set of keys.
Figure 4:
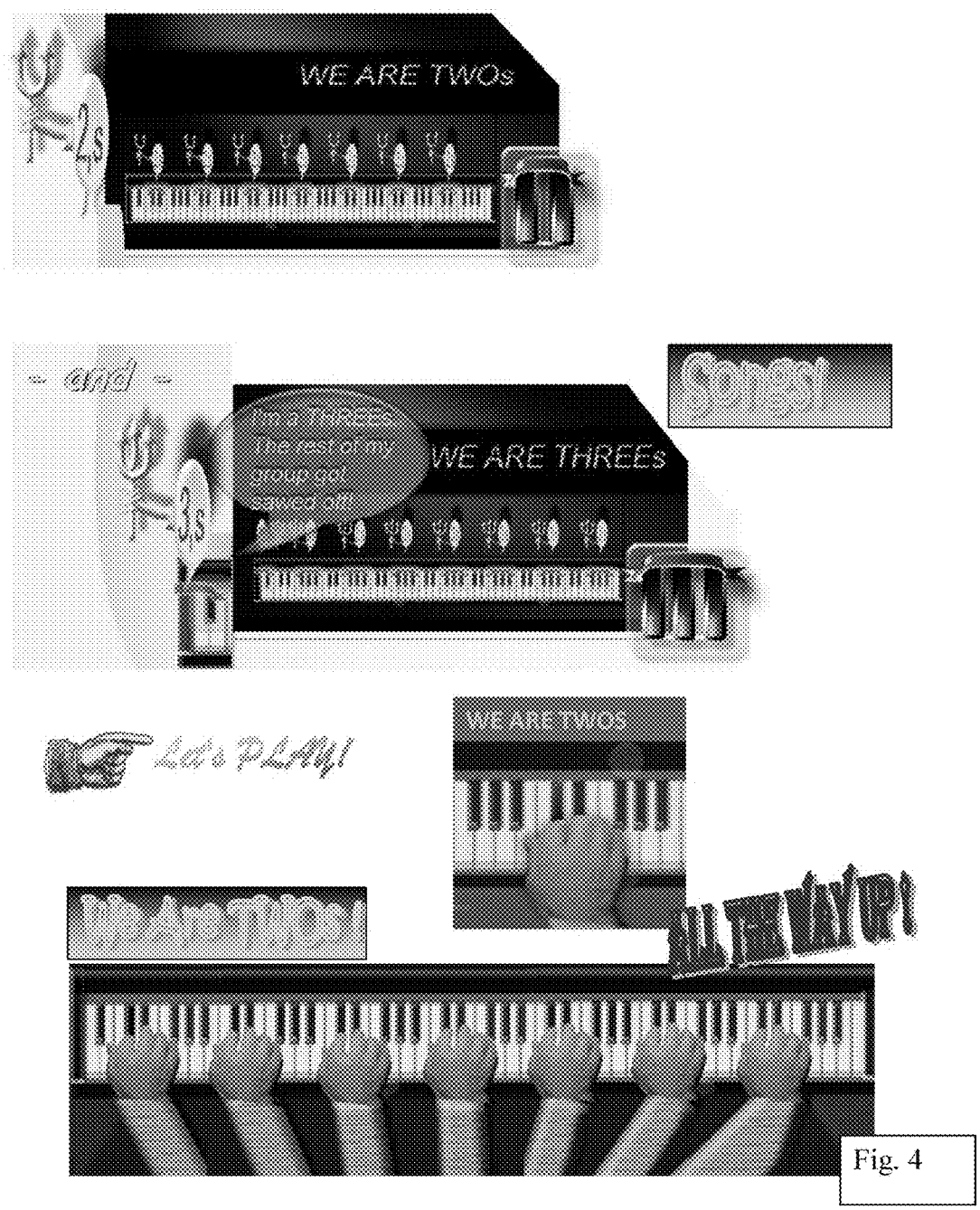
FIG. 4 depicts a way of naming and identifiying the groups of black keys as well as a way of engaging with the groups of black keys.
Figure 6:
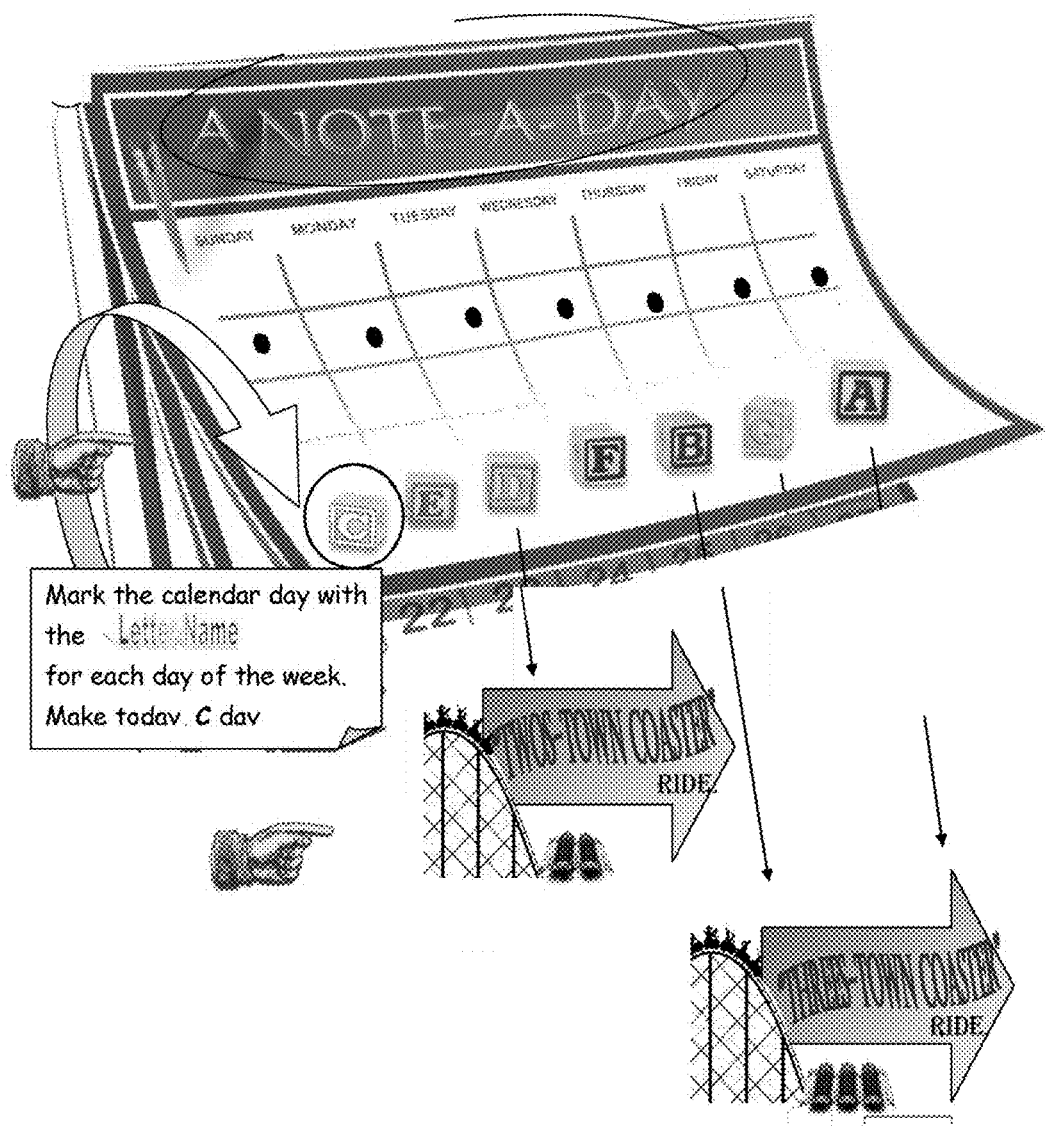
FIG. 6 depicts a method of learning a new note daily as a week long assignment.
Figure 7:
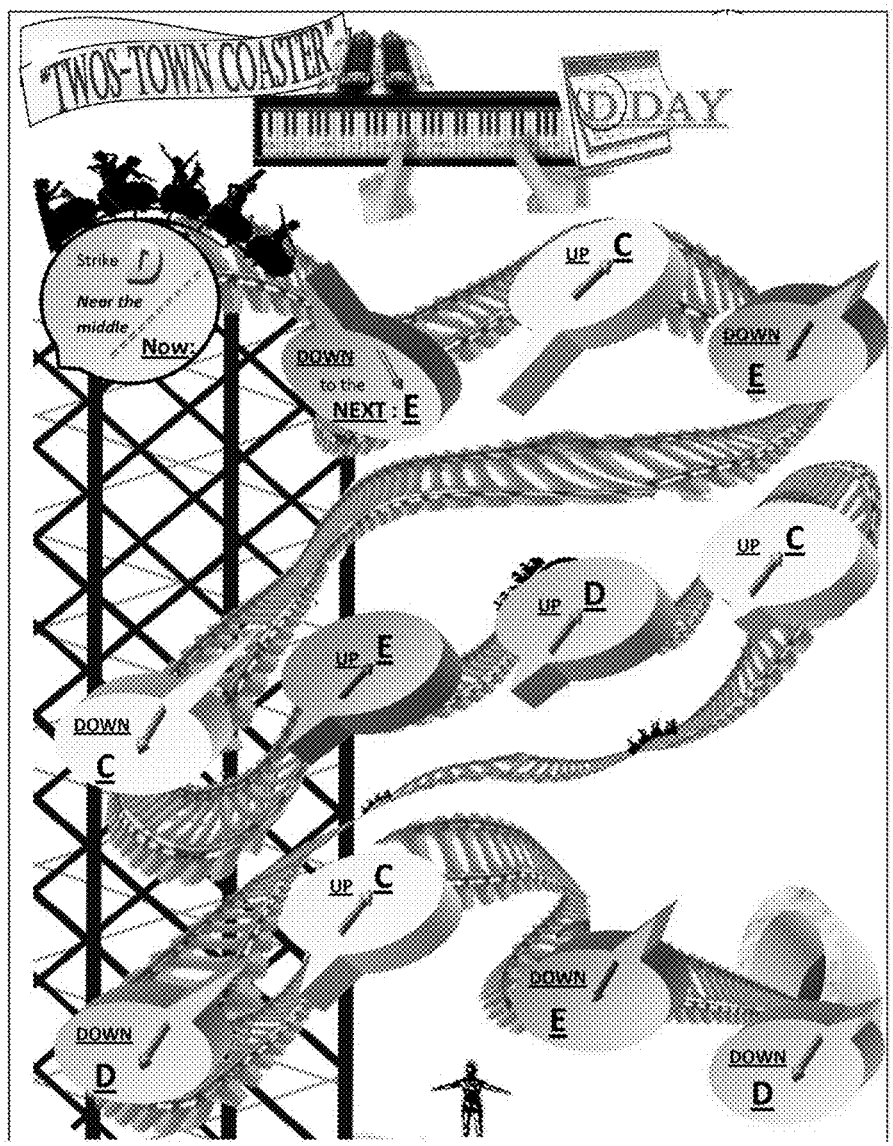
FIG. 7 depicts a method that can be used to engage with the white keys surrounding the two black keys as well as to allow a teacher to evaluate a student's progress.
Figure 8:
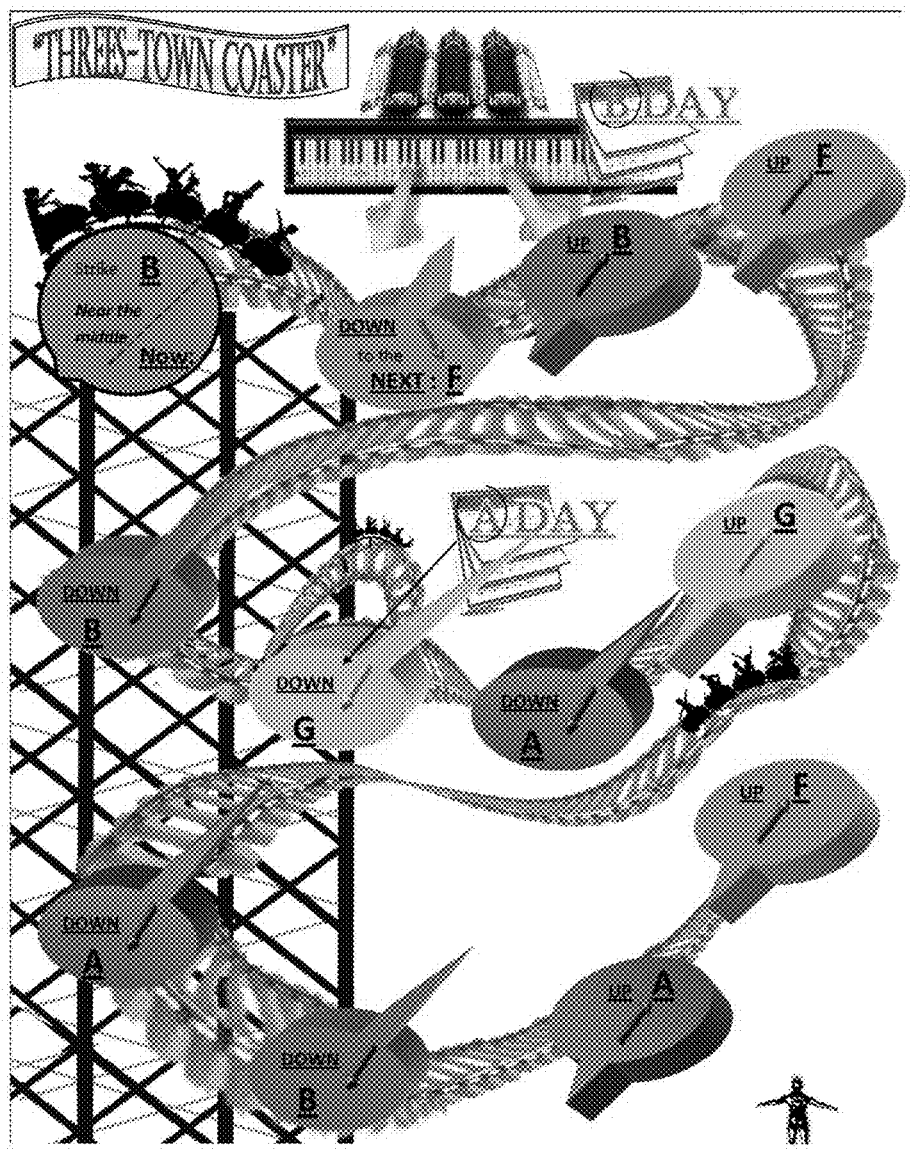
FIG. 8 depicts a method that can be used to engage with the white keys surrounding the three black keys as well as to allow a teacher to evaluate a student's progress.
Figure 9:
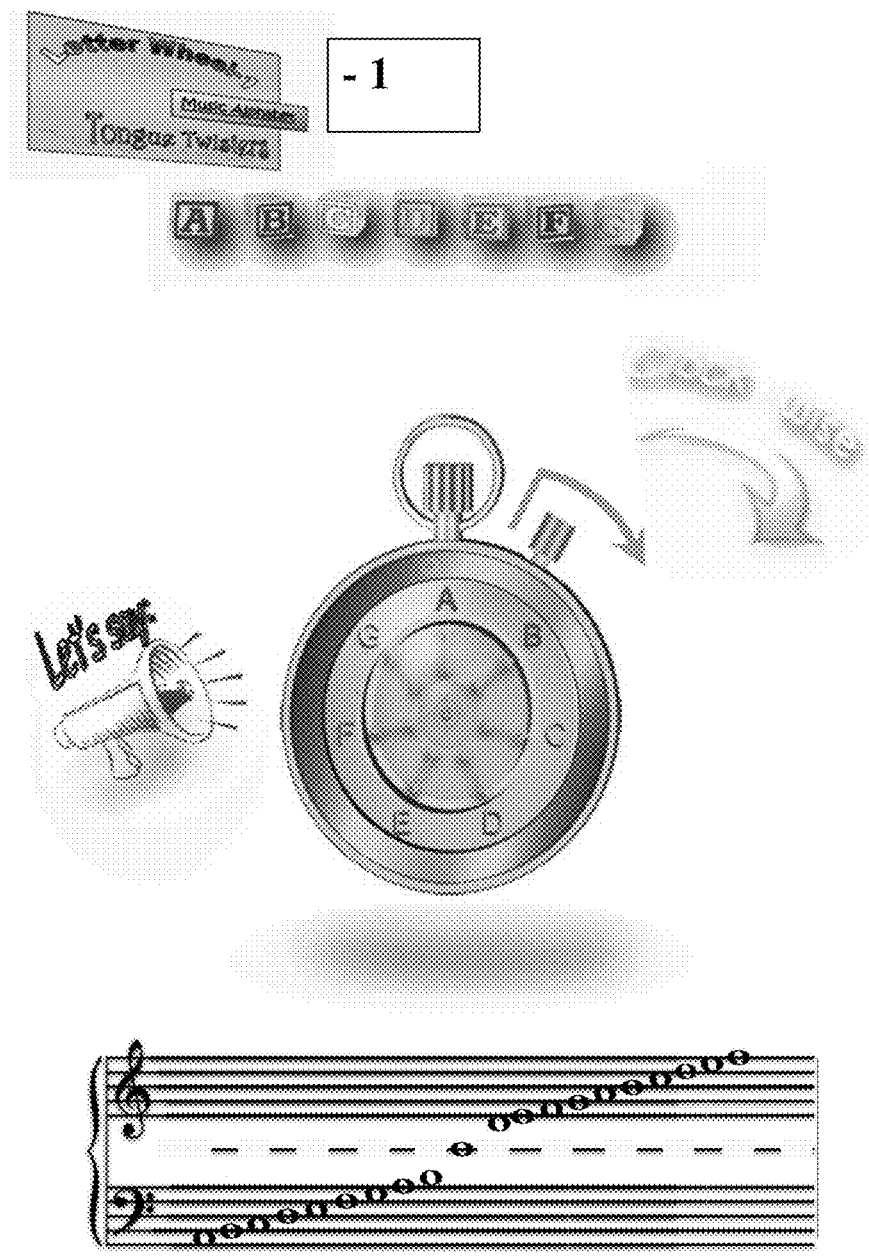
FIG. 9 depicts an exercise one can perform to better understand the musical alphabet in a continuous repeating cycle.
Figure 10:
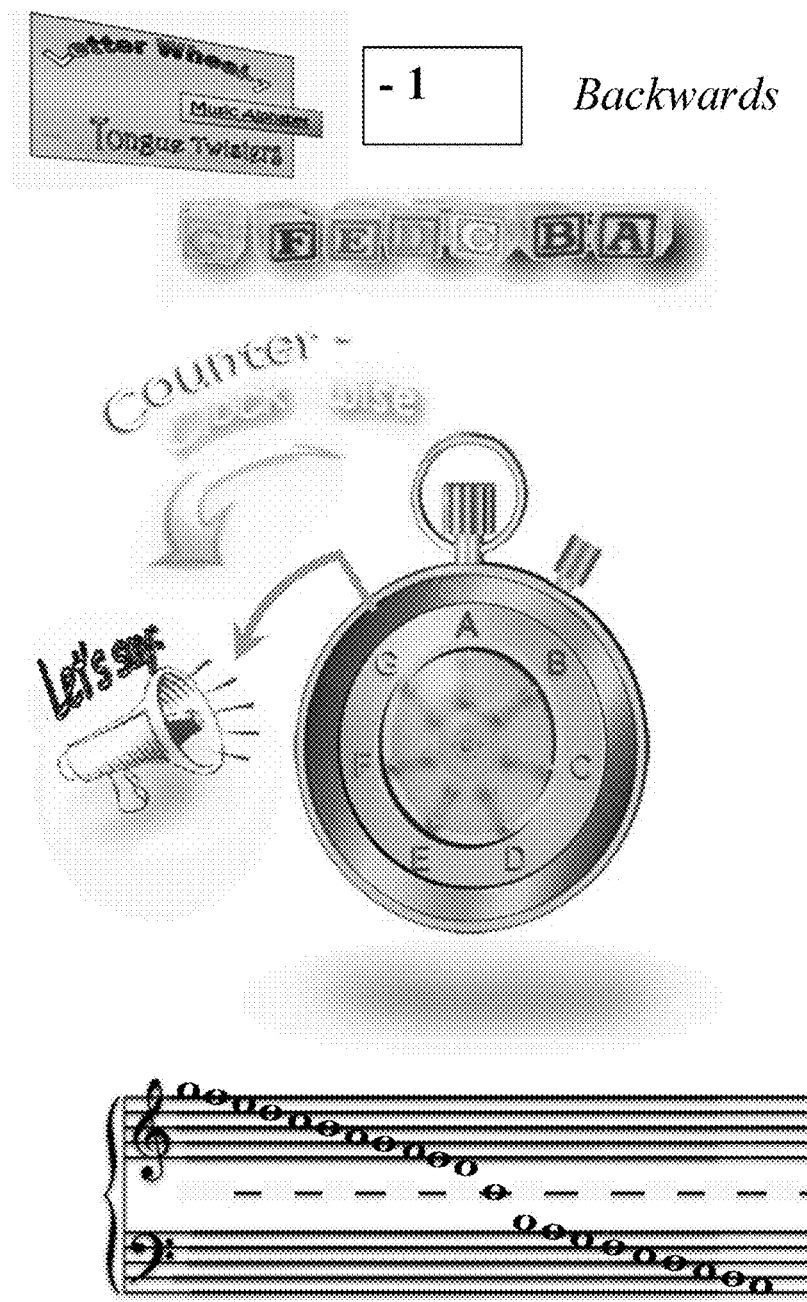
FIG. 10 depicts another exercise one can perform to better understand the musical alphabet in a continuous repeating cycle.
Figure 11:
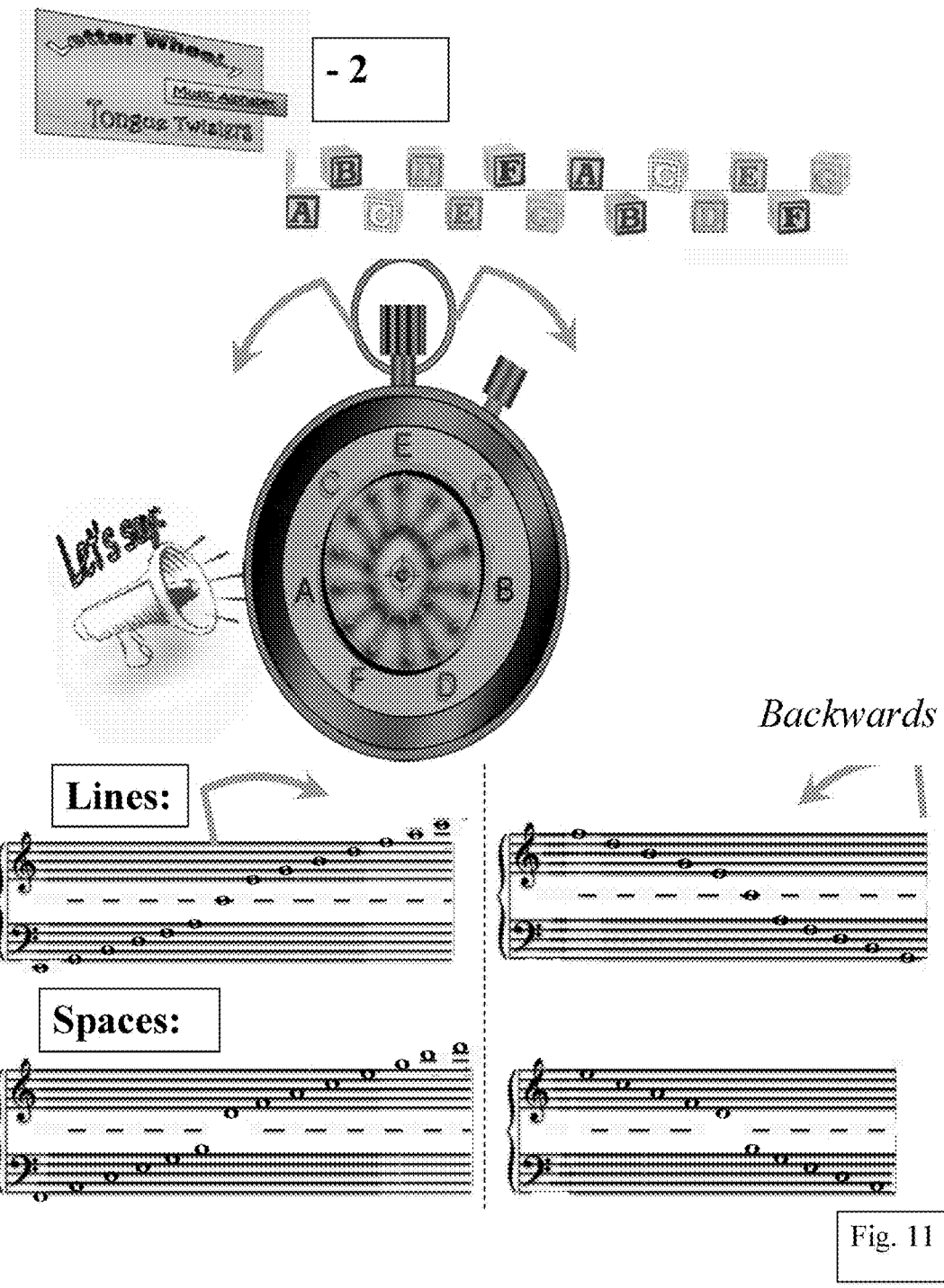
FIG. 11 depicts another exercise one can perform to better understand the musical alphabet and how it relates to the lines and spaces of the musical clefs in a continuous repeating cycle.
Figure 12:
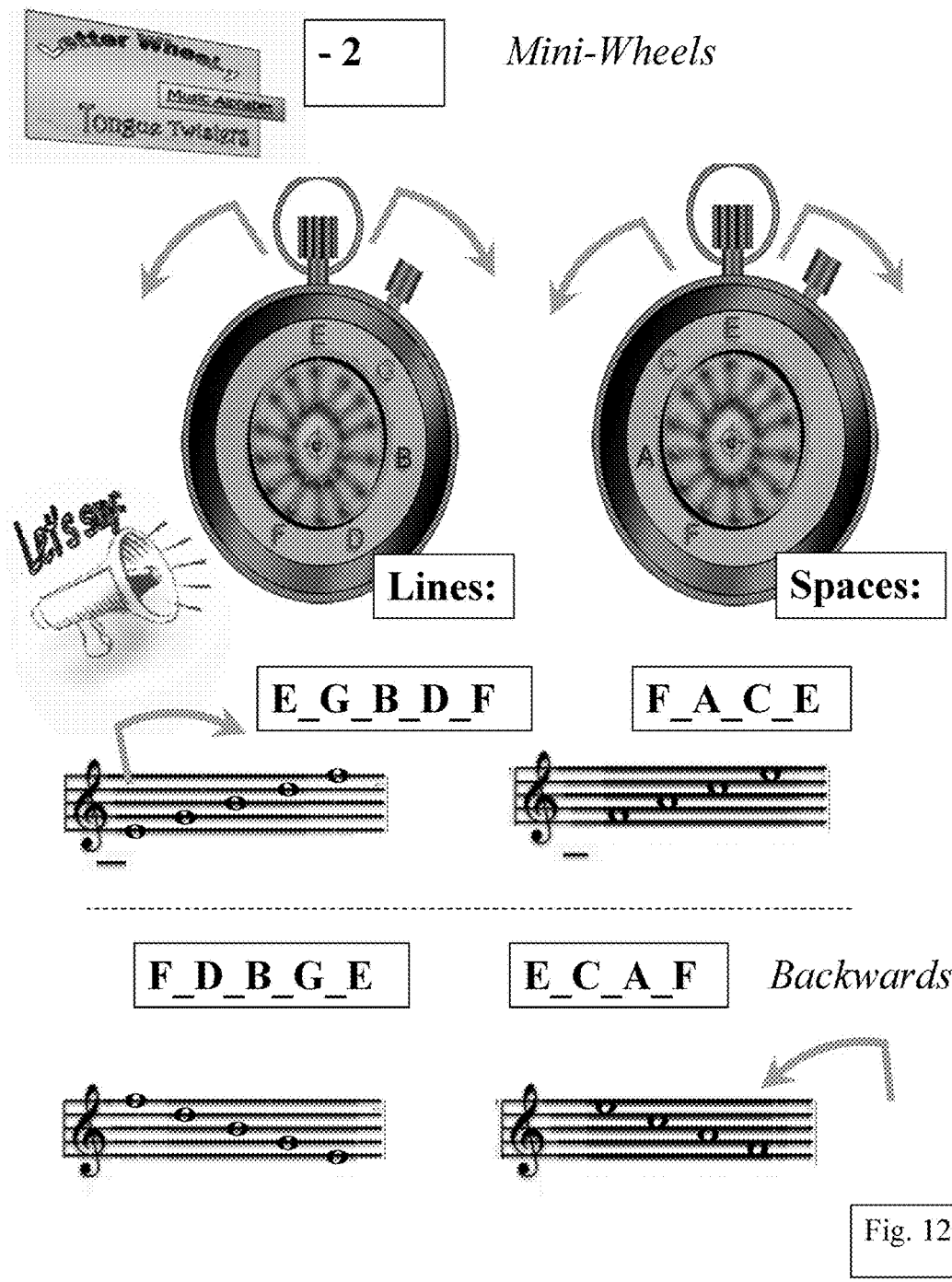
FIG. 12 depicts another exercise one can perform to better understand the musical alphabet and how it relates to the lines and spaces of the treble clef broken into two smaller cycles.
Figure 13:
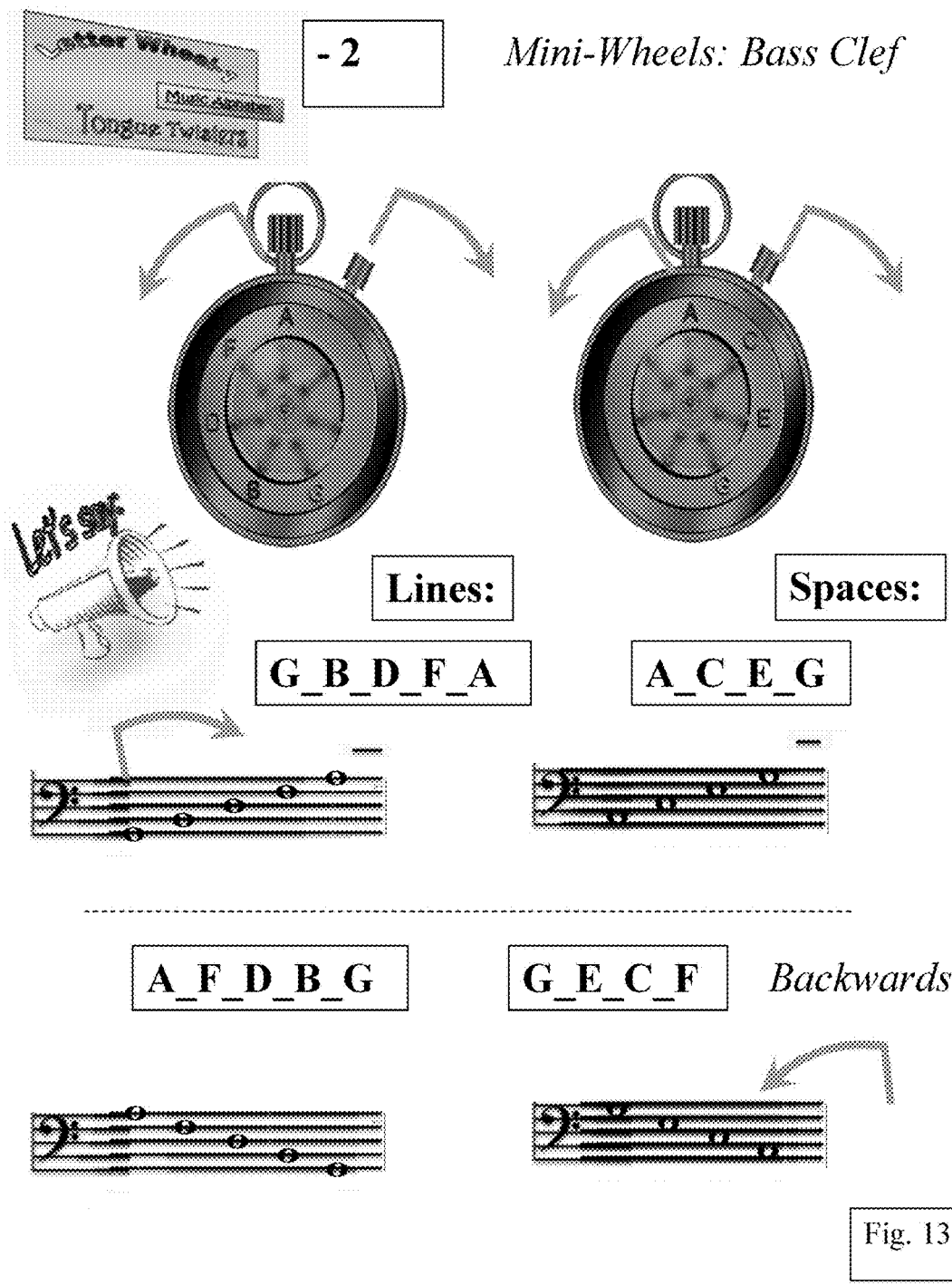
FIG. 13 depicts another exercise one can perform to better understand the musical alphabet and how it relates to the lines and spaces of the bass clef broken into two smaller cycles.
Figure 15:
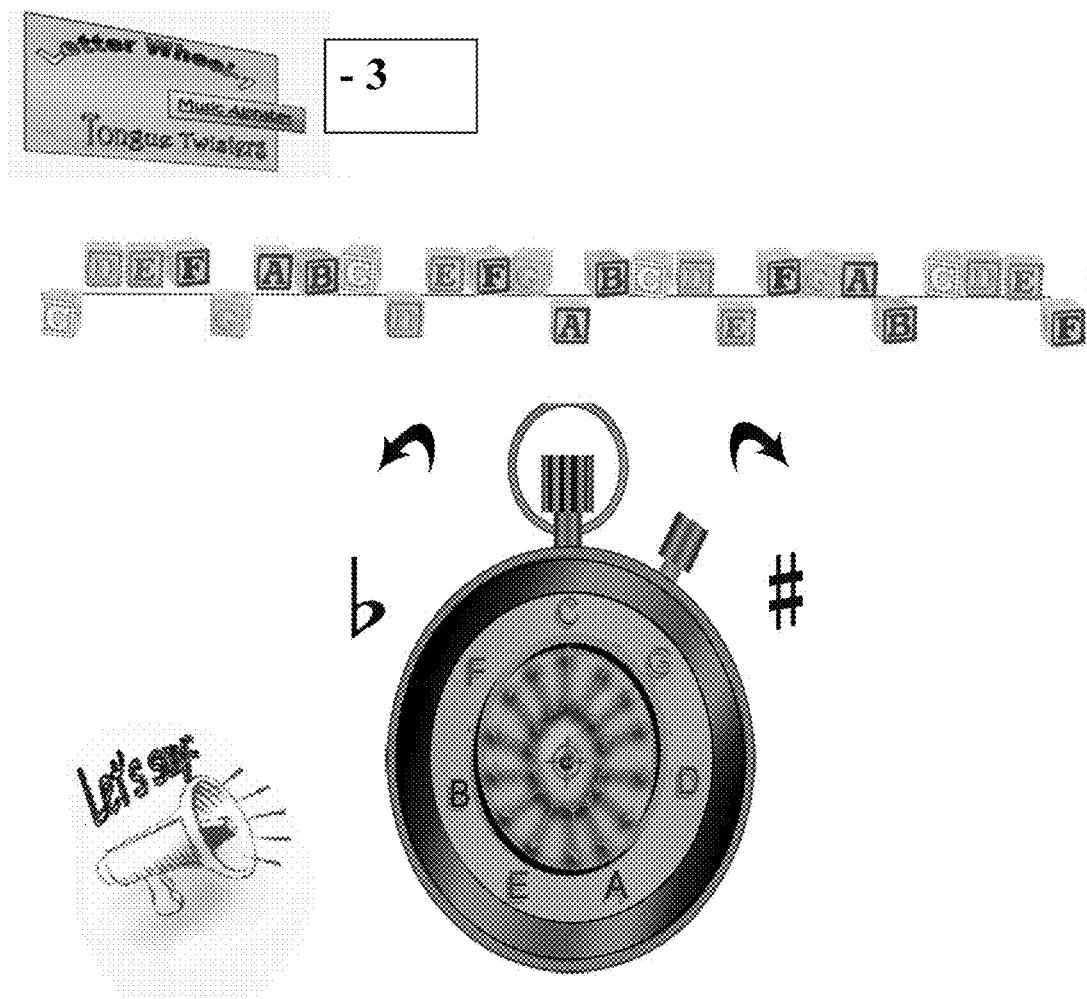
FIG. 15 depicts an exercise one can perform to better understand the musical alphabet in a continuous repeating cycle every fifth letter.
Figure 16:
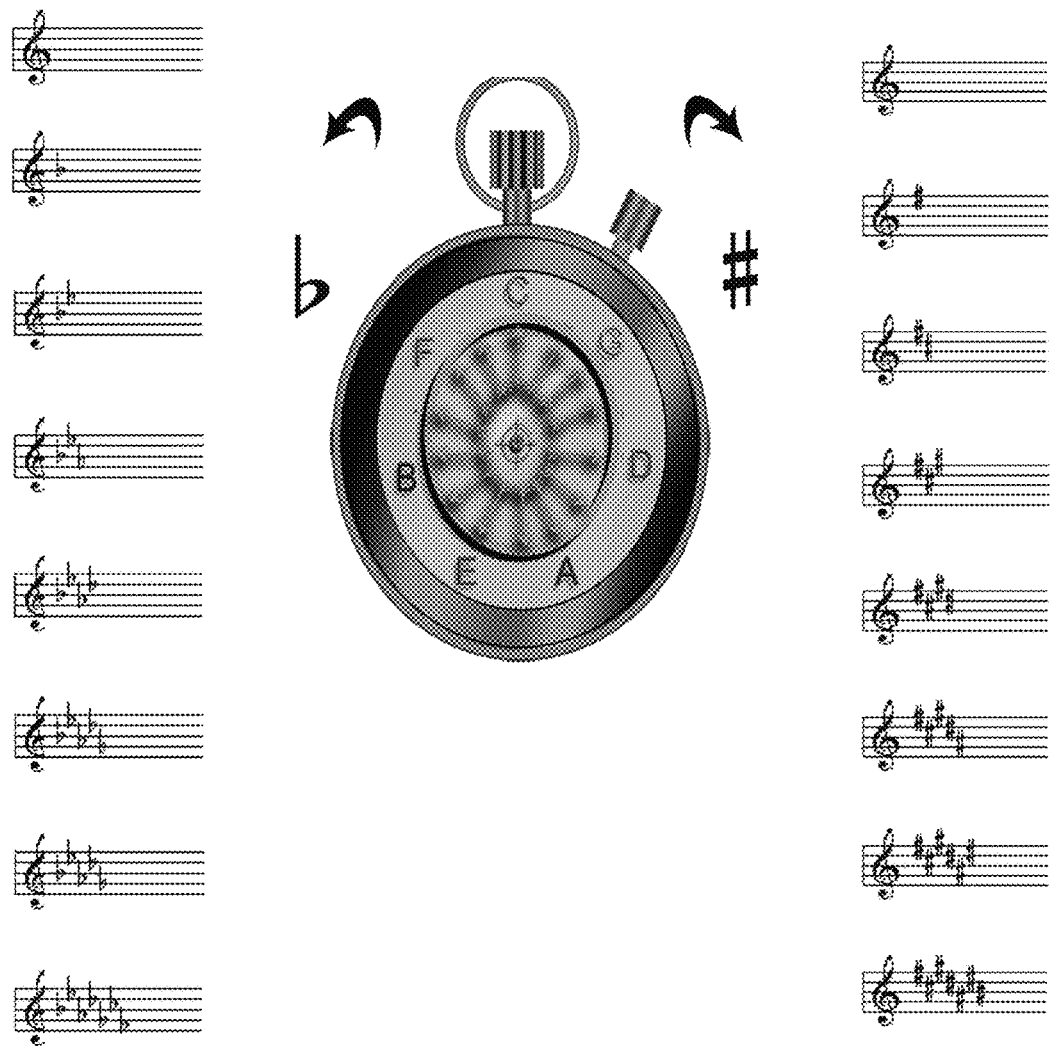
FIG. 16 depicts a musical application of the above exercises.
Figure 17:
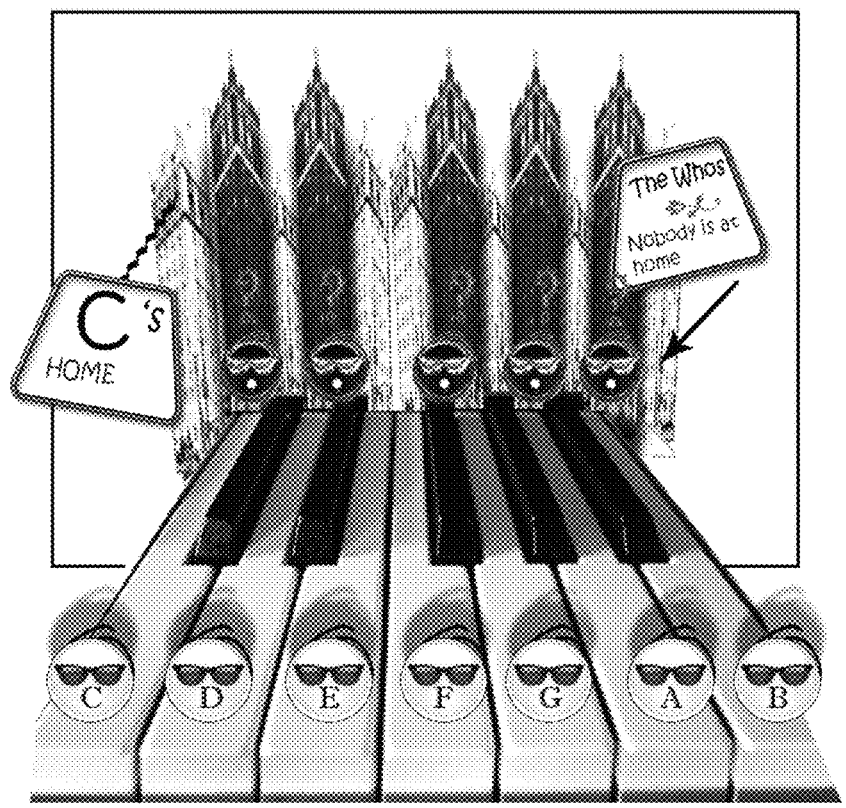
FIG. 17 the default tonal center of C-major, which has no sharps or flats.
Figure 18:
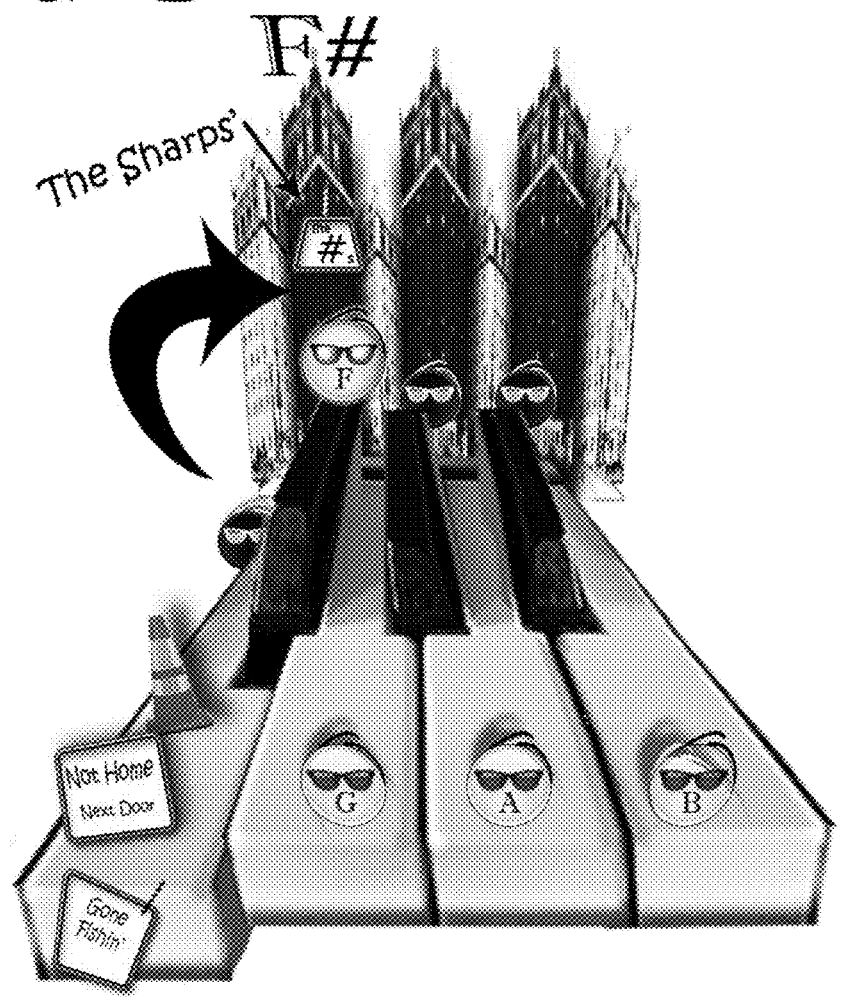
FIG. 18 depicts the tonal center of G-major, the first tonal center which requires a sharp.
Figure 19:
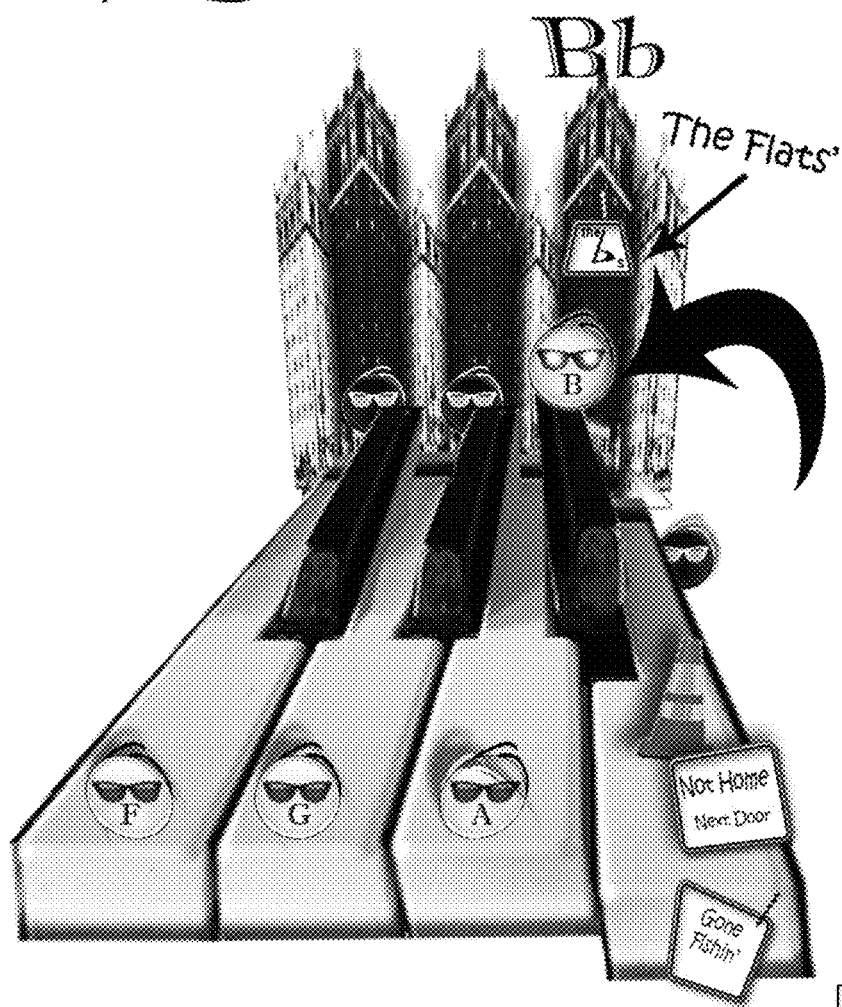
FIG. 19 depicts the tonal center of F-major, the first tonal center which requires a flat.
Figure 20:
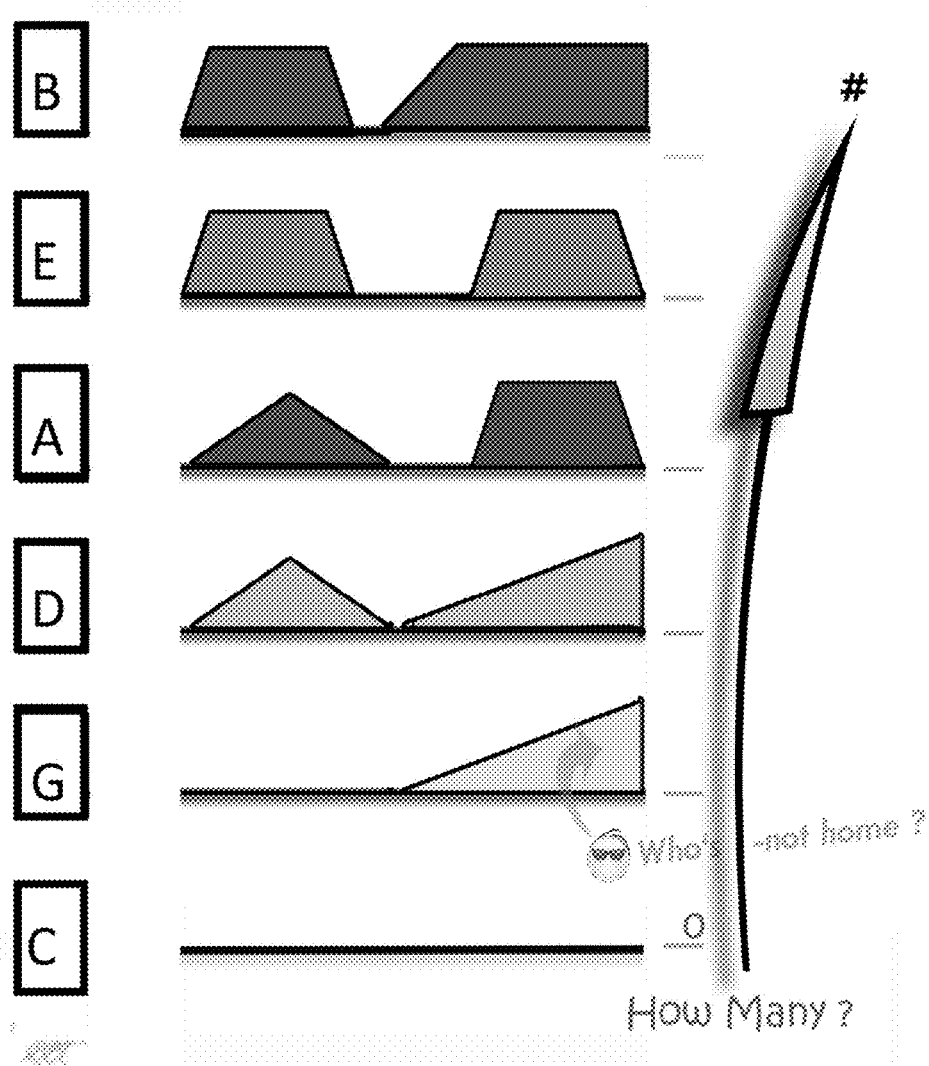
FIG. 20 depicts which black keys are active in a particular tonal key in an easy to memorize and implement fashion.
Figure 21:
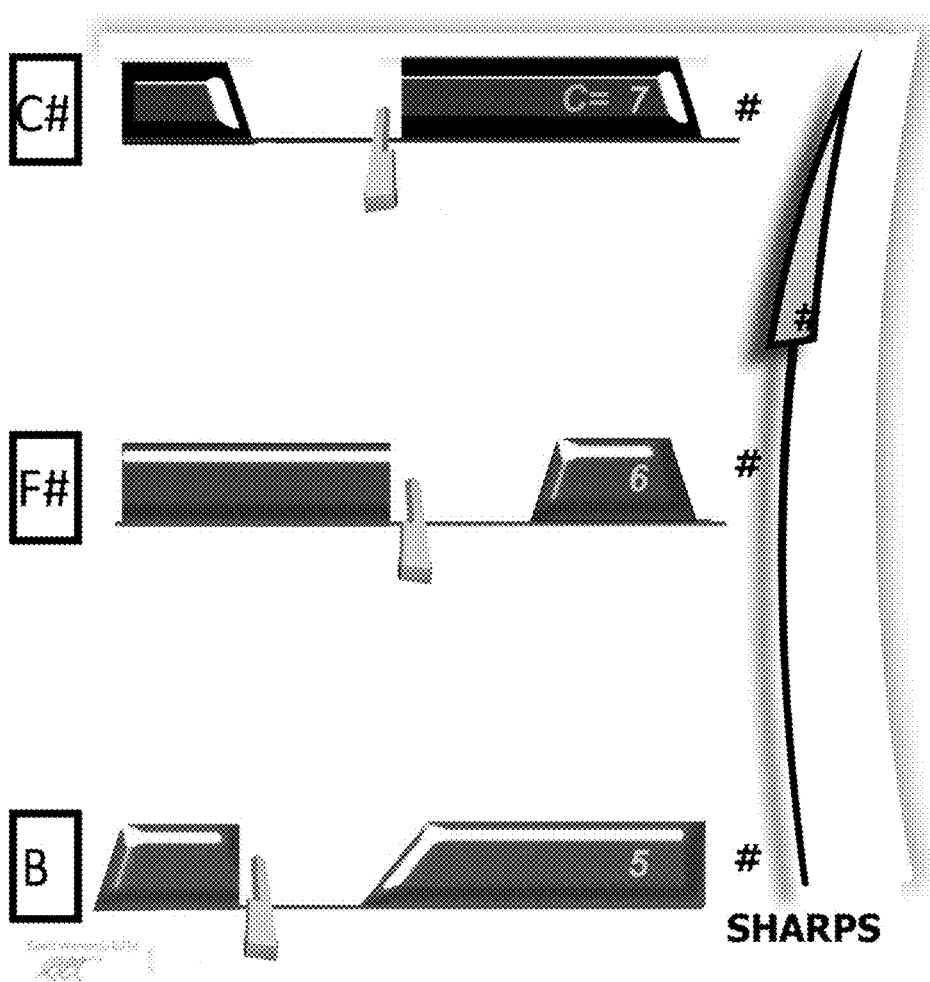
FIG. 21 depicts which black keys are active in a particular tonal key in an easy to memorize and implement fashion.
Figure 22:
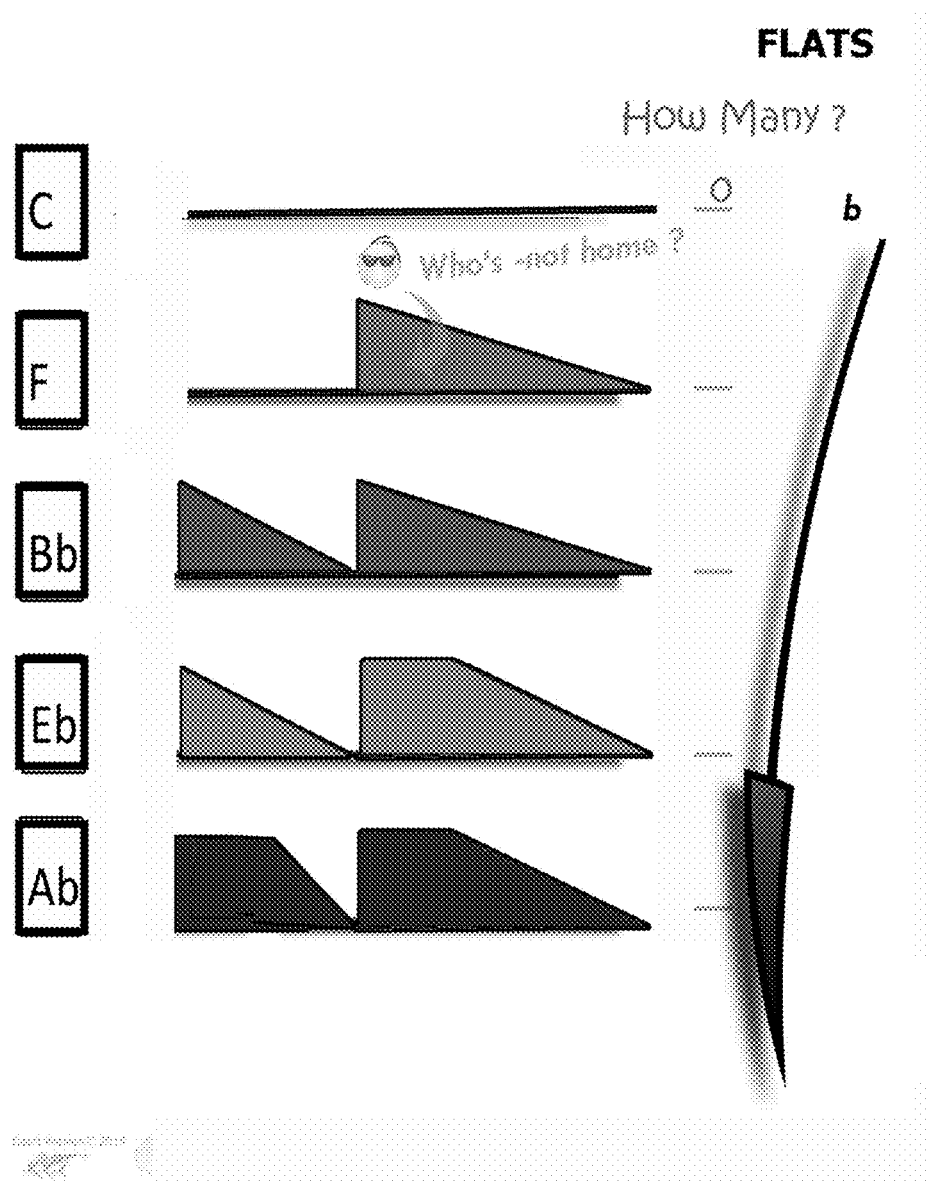
FIG. 22 depicts which black keys are active in a particular tonal key in an easy to memorize and implement fashion.
Figure 23:
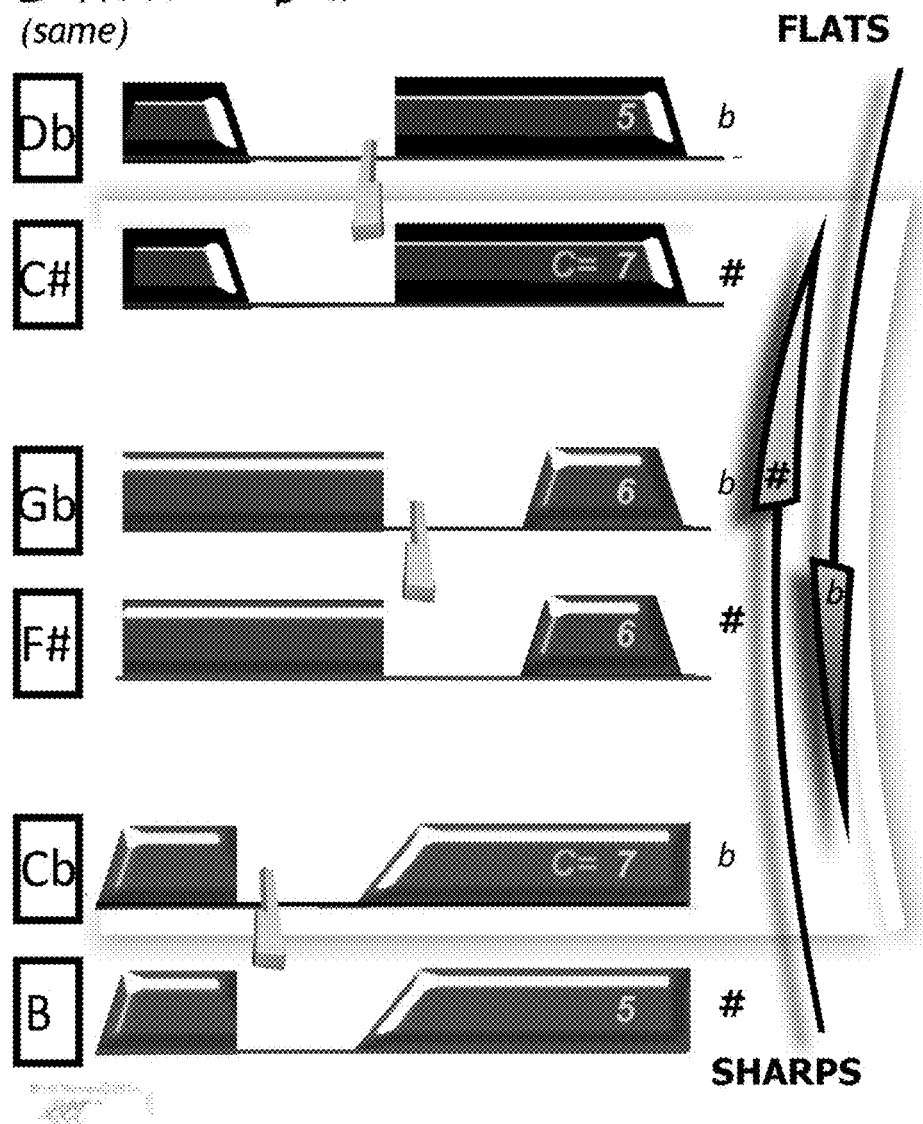
FIG. 23 depicts which black keys are active in a particular tonal key in an easy to memorize and implement fashion.
Figure 24:
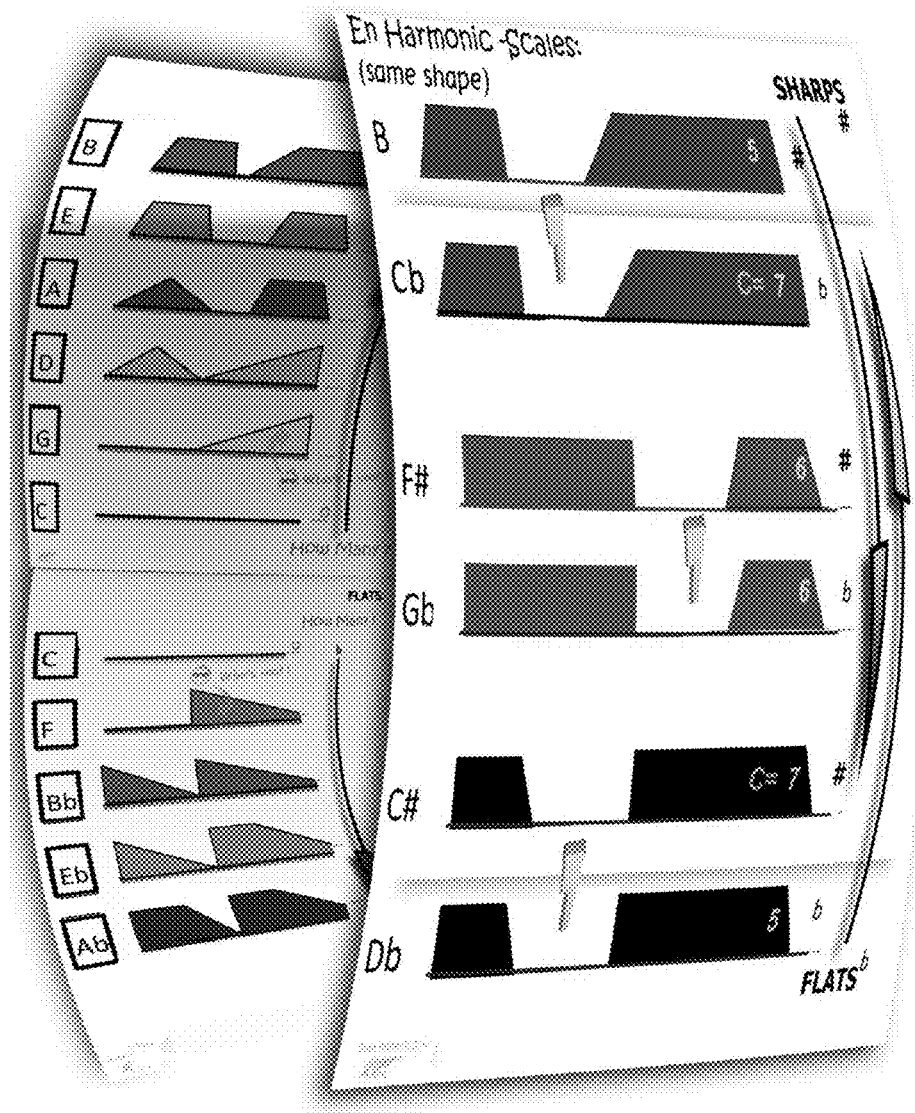
FIG. 24 depicts which black keys are active in a particular tonal key in an easy to memorize and implement fashion and displays how the enharmonic keys overlap.
Figure 25:
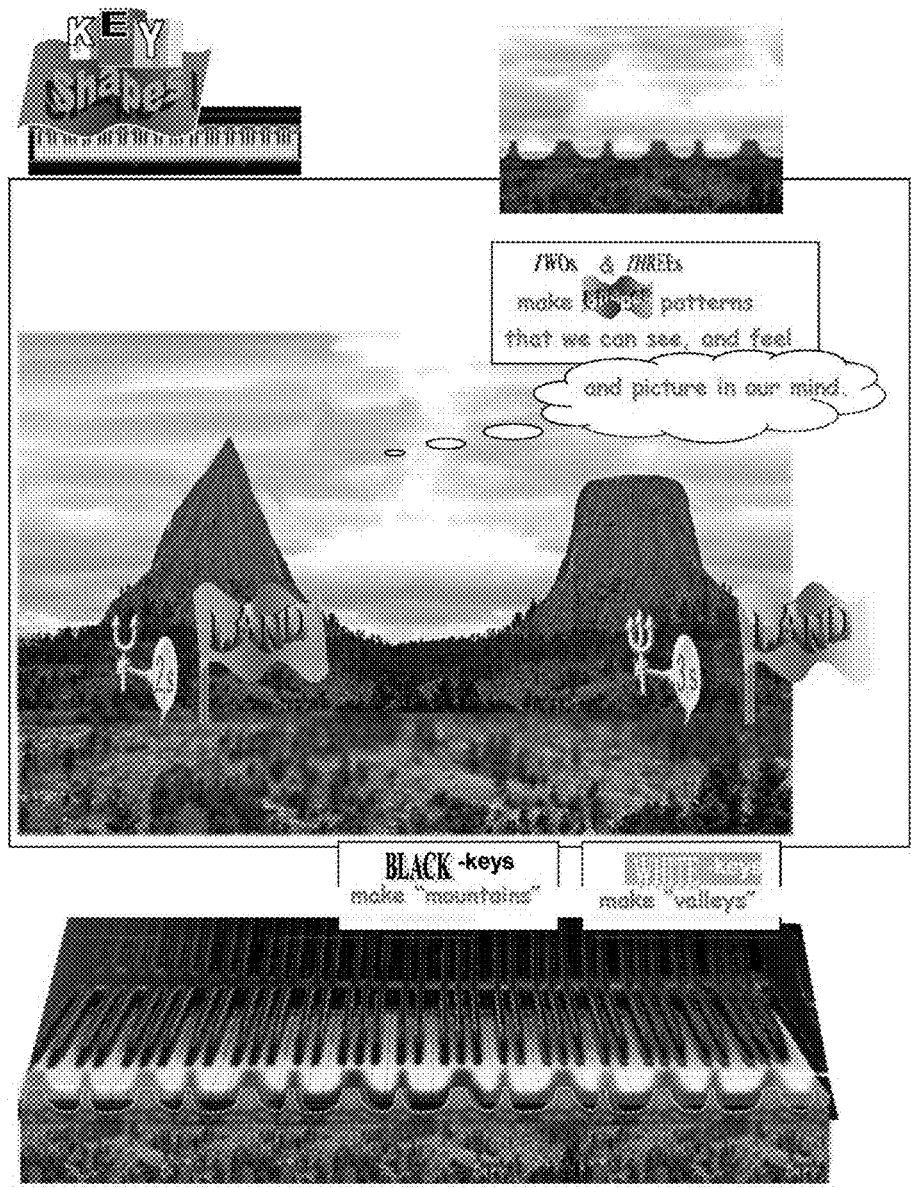
FIG. 25 depicts the black key shapes depicted by mountains and the white keys depicted by valleys between them.
Figure 26:
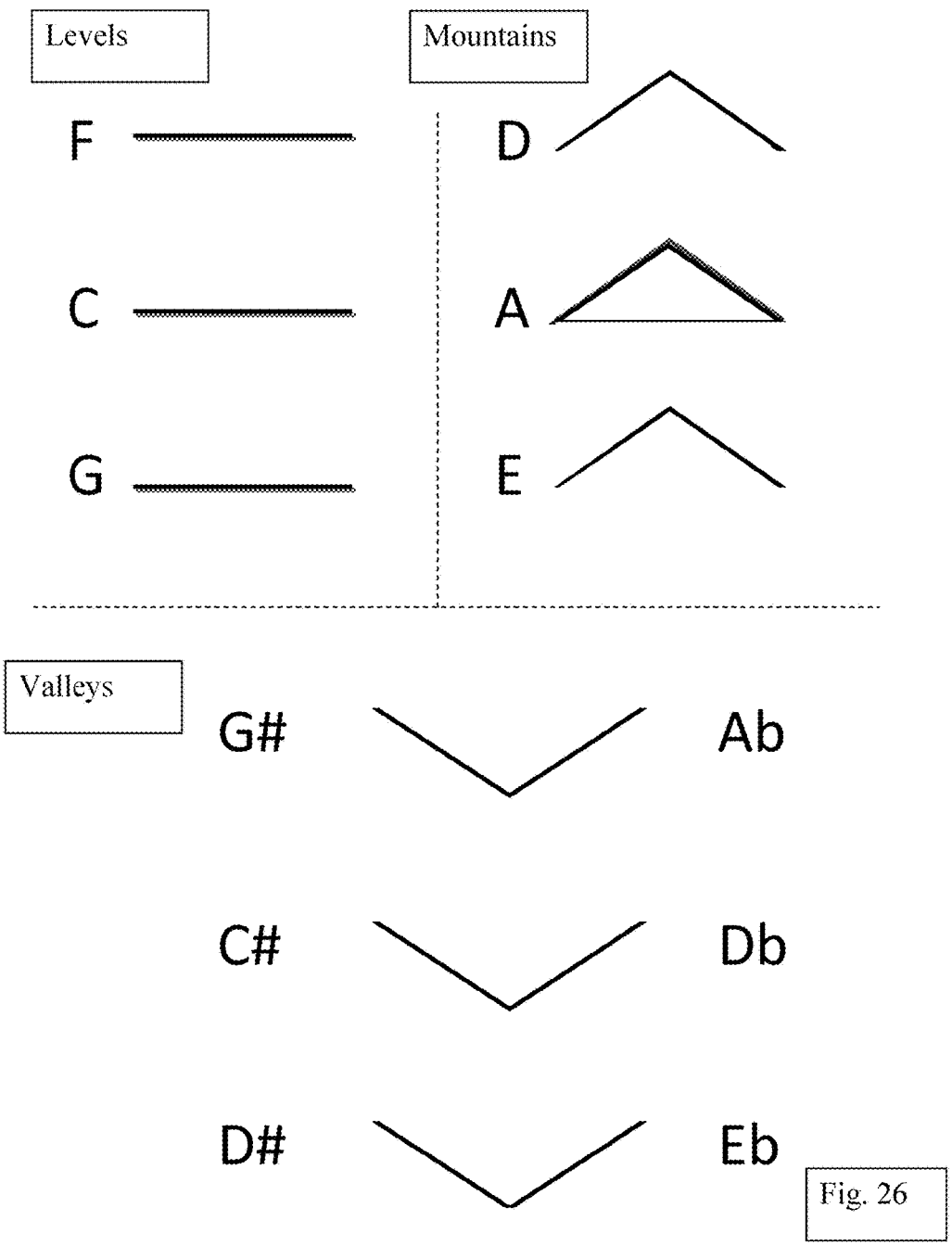
FIG. 26 depicts some of the major chords grouped by the shapes that the black keys cause them to make.
Figure 30:
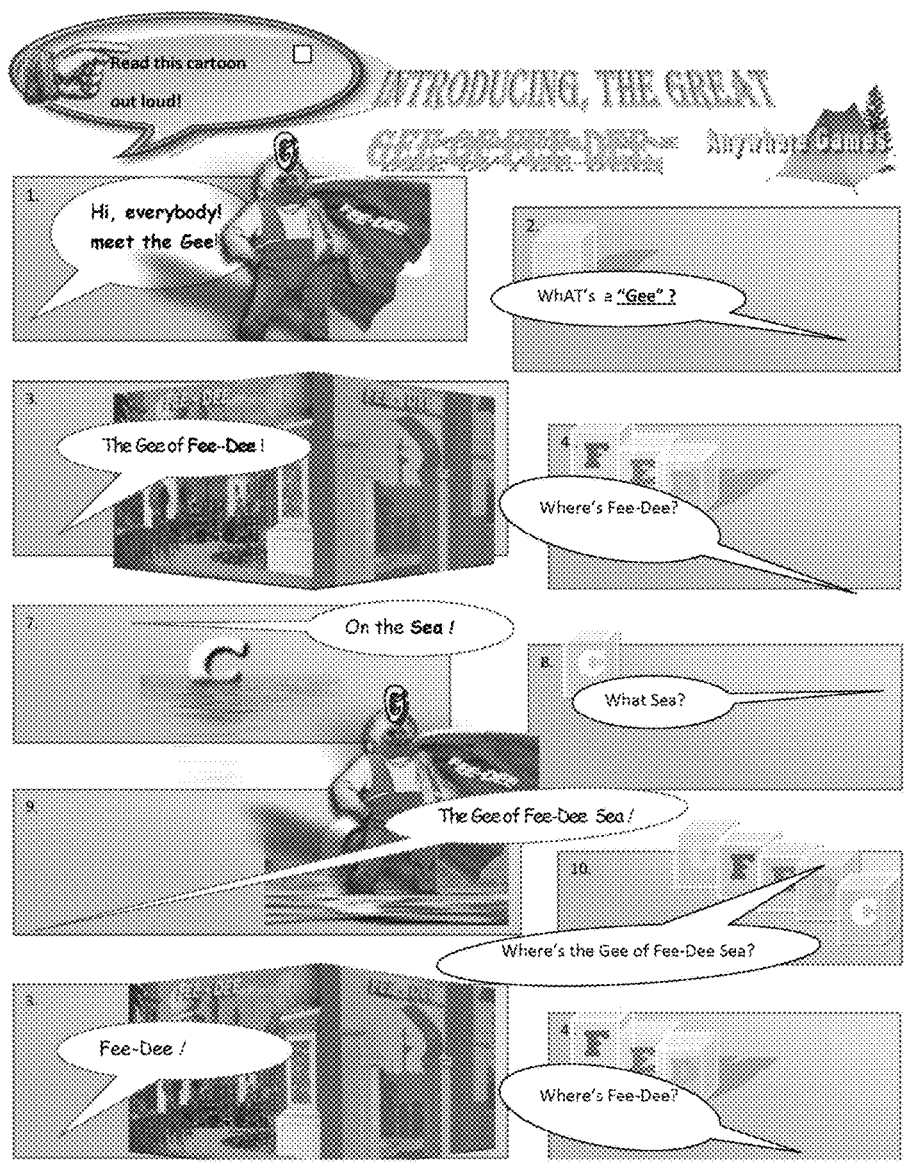
FIG. 30 depicts a cartoon which is designed to cause you to recite the musical alphabet backwards.
Figure 31:
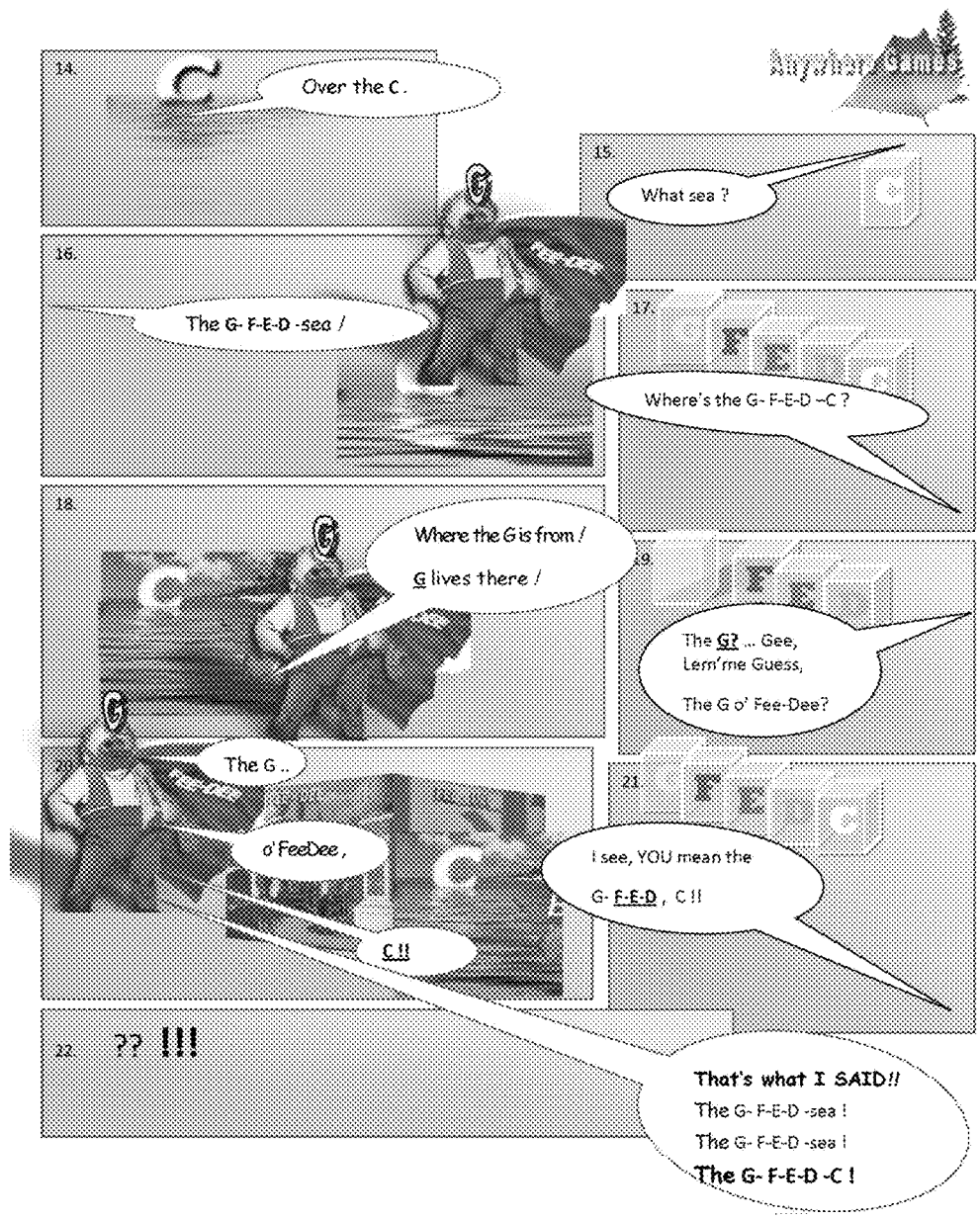
FIG. 31 depicts a cartoon which is designed to cause you to recite the musical alphabet backwards.

It should be noted that, based upon the foregoing depictions, it will be apparent that many applications and combinations of the present invention are possible once various configurations of the present invention have been disclosed.

DETAILED DESCRIPTION

For the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It should be noted that techniques can either be computer implemented or explained live.

The solution to the problem of "telling the keys of a keyboard apart" has been attempted by many prior methods by applying techniques and processes such as letter labels, and light-up lettered keyboards but they are neither effective nor necessary. The disclosed method uses nothing more than a standard keyboard.

By addressing this issue using the inherent features of a keyboard, one notes that the black keys are organized in a balanced repeating pattern of two and three keys so that one can navigate a keyboard. This fundamentally different perspective on learning music shapes the entire structure by which a student learns to play music. Often, many students are secretly unconvinced that the pattern is consistent, reliable, or significant. That lack of understanding may become overlooked. In that case, the student's ignorance of the pattern may remain undetected for their entire engagement with music. This lack of simple insight often causes many frustrations as a student is challenged to progress by their music teacher(s). Because every advancement pertaining to pitch in music they encounter will be based on the student's grasp of that pattern, they may struggle with this for the entire duration of their musical endeavor. "We Are Twos" and "We are Threes"Among other things, this method proposes that there is a very effective reason to acknowledge the black keys of the keyboard at the very entry point of a musical education. This is important because the pattern that the black keys provide is the native pattern by which all western music is constructed, understood, and aurally perceived. However, more importantly for the beginner, the black keys provide a valuable visual and tactile aid. This method sets up the neural pathways to the black key groups to allow a student to become very familiar with the keyboard very quickly. Tradition demands that the black-keys are referred to as "sharps" or "flats." A music teacher can avoid the discussion of the complicated musical labelling of the black keys by using a placeholder to describe the keyboard zone which contains the black keys. In doing so, the teacher is then free to confront the black keys and utilize them solely for the elementary advantages the black keys provide. In essence, using the black key patterns to navigate the keyboard is far superior and doesn't rely on external aids or gimmickry such as stick on letter overlays. Traditionally the black keys are neither "sharp" nor "flat" until a white key is altered 'to' one of them. As the black keys are not traditionally named, they are therefore anonymous in that they have no names of their own. Again, their names are only inherited from the white keys, and accordingly named after the white key that was either sharped or flatted to them. By applying this exception and therefore labels of "Twos" and "Threes," to the sets of nameless black keys, it serves as a placeholder for the more complex topic of "sharps and flats" to be explored later without violating any musical law or fact. In this way, the black keys can be addressed immediately solely for the purpose of identifying and recognizing the pattern they provide. The teacher can then avoid entanglement in complexities while utilizing the black-key pattern, and quickly move on to other elementary concepts that are suitable for a beginning piano student.

Even the youngest infant being introduced to the keyboard can be shown to use fingers to accommodate the black keys. Those fingres are those other than the thumb and pinky. Obviously there are three for the threes and the pointer and middle are used to activate the twow. Therefore, as their fingers grow, they are manipulating the keys with individual fingers from a very early stage. When their fingers are fully grown and powerful enough to manipulate those keys (as in the case with more advanced students) they will realize that they have come full circle to appying those very same fingerings to the most advanced scales including the pentatonic/blues scale. The pentatonic/blues scale then can easily become portable to other transpositions.

One of the reasons that the black key pattern is non-obvious is that there is always a "one" at the left of every piano. And in the age of compact keyboards the "one" might appear at either end, or not at all, depending on the different designs each keyboard manufacturer might employ. The fact is that there is no such thing as a "one" black key in music. There is only either a "Twos," or a "Threes" set which infinitely vary from the lowest pitches to the highest pitches. That pattern is immutable. By calling a student's attention to this fact, this mystery therefore is immediately and quickly addressed and solved by this method. These itemized fringe benefits are but a bi-product of the focus intent of the method, which is to engage the student with a firm cognitive familiarity with the black key pattern. This is because within the disclosed method these patterns will become the lighthouse to which illuminates the seven different named white keys. It will then be further utilized toward that purpose in the method by creating a fictional environment that resembles the pattern which this method will refer to as "Twos Town and Threes Town."

In order to progress seamlessly in music, it is essential for the piano student to achieve the ability to quickly recognize each key independently by its own appearance. The most natural and effective way to learn to recognize any thing or any body is to cognitively describe the object or person. Especially if the chosen description is verbalized, the recognition can be facilitated and committed to long term memory upon the initial first impression. If one is "bad with names" during social pressure, for example, a method to overcome the embarrassment upon first introduction is to immediately state the newly learned name to the person. In terms of recognizing the keys, the method applies this principle to commit the recognition of piano keys to long term memory.The method therefore begins by interactively requesting the student to describe a chosen white key. In doing so, typically with the novice student, confusion arises as to how to describe a particular white key. A dialog may result that is ineffective for committing certain vague or overly accurate descriptions to long term memory. Points such as the physical shape of the key or its position to the other white keys may be discussed. The two groups of black keys will be referred to "Twos" and "Threes" which are surrounded by the seven different letter named white keys. The method breaks the seven white keys into two groups that the black keys define. Three of the white keys are situated between and around the "Twos" black keys and the method refers to this set of keys as "Twos Town." Likewise, the remaining four white keys are situated between and around the "Threes," so the method refers to this as "Threes Town." A graphic representation of each of the two "towns" is depicted as black and white buildings in the attached figures. The black buildings are described as landmarks that define the white buildings and their names. By applying the analogy of "towns" to the two sets of keys, the analogy is further developed so that the student has a way to verbally describe each white key individually. This facilitates the needed ability to recognize each white key independently from the others. For example, in "Twos Town," the student is instructed to say "C below the Twos" while striking the white key known as "C." The white key above the "twos" is always named "E." So that both "C" and "E" can now be described as sitting "on the border of the twos." The remaining white key of "Twos-town" then, is "D" which can be described as "between the Twos." The method then requires the student to verbalize these descriptions. So that they would say "above," "below," or "between" "the twos" to identify and describe each of the white keys in "Twostown" accordingly while striking that particular key. The method further utilizes the analogy by alternatively describing the notes "C" and "E" as "on the border of the Twos", and "D in the 'alley' of the Twos." The method then applies this same principle to the white keys of "Threes Town" which addresses the remaining four white keys. Two of the white keys of "Threes Town" are "on the border" and the remaining two are located "in the alleys of the Threes."

Coaster Games

A method of evaluating a student's command of the individual white keys without relying on their adjacent alphabetical neighbors. The process intentionally requests rapidly finding keys that are not adjacent, and in various patterns. The student identifies them by their position in relationship to the black keys rather than their alphabetical neighboring white keys. The implementation of the Twos and Threes segregates the white keys into two groups for patterned identification. The process produces combinations of white keys that are easily confused by their juxtaposition to the black keys in that they are either above, below, or between their black key groups. The exercise eventually randomizes the target answers by non-linearization so that each white key can be uniquely recognized on its own merit. The combinations that are easily confused involve playing a C and then an E, which is intentionally designed to challenge students based on the way of identifying the keys using the black keys. This is achieved by instructing the student not only to find and demonstrate the given white key, but by including the instruction to "find the next key" with that name "up from" or "down from" the last key pressed. This added instruction achieves resulting large intervals between the called for keys. This causes the un-alphabetization of the requested keys. In this form of randomization the student will become forced to rely on the key's position to the black keys rather than its adjacent neighboring set of white keys. Utilizing the black key pattern is much more effective than adjacent white key alphabetization because the black keys are anonymous, and are visually effective.

By appending the "up-to" or "down-to" and "to-the-next" instruction to the letter name, the student is simultaneously acquiring another fundamental understanding of up and down, and the sound higher keys produce than that of lower keys. This acclimation to "up and down" as well as "high and low" which is executed on the horizontal keyboard as right and left is foundational to a student's seamless progresssion. Because it is second nature to a skilled piano teacher, it is often taken for granted that the correlation of up and right or down and left is also second nature to the student. This method is therefore also a process to actually address practice demonstrate and evaluate that otherwise vague understanding expected of the student. Furthermore this method aids to eliminate false positive results such as alphabetization where the teacher's evaluation is based on the student's ability to independently rapidly recall the white keys by name. As a method of practice as well as evaluation, the "coaster" method also equips the piano teacher with an evaluation method for new students. A new student may already have a firm grasp of the "up and down," "right and left" correlation, and/or a firm grasp of the white key letter names. By applying the "coaster" method the teacher can quickly and easily assess that ability and thus proceed with that student while avoiding redundant instruction. Conversely a new student may have the ability to demonstrate vast experience on the keyboard such as performing music that is above the beginner level. Yet that student may yet have a weakness in the area discussed here. Especially since the student and/or previous teacher(s) may have overlooked these skills for reasons mentioned earlier. Therefore, in summary, the "coaster" method also equips the new teacher with a quick and courteous method to evaluate a more advanced new student on these rudimentary skills.

Letter Cycles

Letter cycles allow a student to quickly familiarize themselves with the surprisingly few repetitive note patterns that encompass all possible note patterns. The musical alphabet repeats from A to G, which is surprisingly few. While simplifying music to seven verbal letters cannot in and of itself make a novice into an advanced musician it can provide a wealth of previously unconsidered advantages towards obtaining the goal of musical proficiency.

Often times, because people are generally more familiar with and comfortable saying their "ABCs" from A to Z, going backwards can be particularly difficult. Cyclically drilling these note patterns backwards solves a well overlooked subconscious obstacle when comprehending descending scales and intervals. This is important because music is descending roughly 50% of the time so musicians are naturally subconsciously encountering that comprehension obstacle 50% of their musical engagement. It's quite beneficial to study the notes in their order when studying the lines and spaces of a staff in linear order. However, such a cyclical pattern learning system can be used to study other very important patterns. Such patterns include lines and spaces of the staff (both treble and bass clef as well as all of the leger lines), and each and every spelling of every possible root position chords. The set of all available chords is well known the art of music, as is every third as well as sixth interval. In addition, all of these patterns are displayed and can be learned in both ascending and descending order with this learning method. This method differs from and is superior to the traditional approach in that the traditional techniques employed generally are in an effort to allow the student to memorize the letter names in each group. As demonstrated with the spaces group, there will often be a call for the lines to be recognized during a descending order of notes in a composition. In one embodiment of the invention, the group of lines of a staff, for example, would be recited syllabically as in "Eee_Gee_Bee_Dee_Ehff." Upon reciting this a few times, one will discover that it actually has kind of a ring to it. The goal is in rapidly arriving at the name of a given note on a line. Here the lines are memorized sequentially, but in this method that will be developed so that they are respected independently from each other. Initially here, this method begins this process by eventually requiring the lines cycle to be learned counter-clockwise as well. This results in "F_D_B_G_E" or sounded out as intended "Ehff_Dee_Bee_Gee_Eee." This accommodates descending line notes. Ultimately the cyclical pattern drills are going to answer every position or permutation in every clef in one cluster. Just as the piano is linear alphabetically, so is the "Grand-Staff" (Bass and Treble clef adjoined in parallel horizontally, otherwise known as the "Piano" staff—for both hands.) From low to high on the Grand-Staff the letter-names of the white-keys of the keyboard are in fact presented in alphabetical order. In fact, the Grand-Staff is an actual skeletal picture of the letter-named white keys of the keyboard, only because we read from left-to-right, the picture is presented vertically as juxtaposed to the actual keyboard which lays flat horizontally from left-to-right. Therefore, the traditional Grand-Staff, actually functions alphabetically all the way from the lowest appended leger-line below the Bass-Clef, to the Highest appended lager line above the Treble Staff. One of the reasons this is not readily understood, is because the staff nomenclature utilizes not only the lines to represent the white-keys but the spaces between them as well. Therefore alphabetically the system follows the order and hierarchy of "line; space; line; space, etc. . . . Therefore due to the amount of letter-names (7) versus the equations the 5-line and 4-space between algorithm yields, the letter-names of the staff above Middle-C is going to represent different letters that happen to fall on the lines and spaces than that of those which will on the staff below middle-C. If one attempts the math, this is a simple "odd/even/odd/even divided by the odd-number 7 (letter names) equation. The Letter-names are going to fall unevenly. Alternately on a line and then a space. The only reason for segregating these letters into 2 groups (I,e, lines and spaces) for each staff is explained earlier, and pertains to visual categorization. Visual categorization is the only existing method with which to itemize the different lines and spaces throughout the staff. With that method in respect, we now have 4 different letter cycles according to this method. Two of them are for spaces: "F_A_C_E" for Treble Clef, and "A_C_E_G" for Bass Clef. If you say them aloud, you will notice a commonality. Now the method will suggest that, let's assemble them eliminating redundant letters. The result then becomes a mere 5-syllable string, rather than 2 separate 4 syllable strings. The result: "F_A_C_E_G." The method then suggests the same practice with the two letter cycles for the lines. " Assemble E_G_B_D_F (Treble-Clef lines) to G_B_D_F_A (Bass Clef Lines) and eliminate redundant letters between them." The result is simply one extra letter: "E_G_B_D_F_A."Next, the method will instruct reassembly in a different fashion: "Let's assemble only the two letter cycles for treble clef lines and spaces." "E_G_B_D_F" plus "F_A_C_E" while eliminating the redundant repeated letter "F." The result: "E_G_B_D_F_A_C." The method then asks: "after the last letter shown here in the result, what would be the next logical letter in this alternating letter sequence?" Simply put, if the pattern is established as alternating letters as such, what letter would follow the last letter "C"? The answer is "E." We now have a perfect alternating seven letter circle. Because the letter "E" begins the next revolution. Thus, "E_G_B_D_F_A_C_/E_G_B_D_F_A_C"/etc/etc/and so on. It is a complete circle which one can call the master cycle. In another embodiment of the invention, the starting point for the cycle can be randomly determined or pre-determined. All of the the cyclical patterns ever present in music can be embodied in this invention.

Such a cyclical pattern learning system can be used to study other very important patterns, as well. These patterns include every key center and their natural order, and each and every key signature as well as every fifth and fourth interval. It is commonly understood by educated musicians that there really are only 3 unique diatonic intervals (relationship between notes within adhering to a key center structure). They are 2nds, 3rds, and 4ths. Because inverting (flipping the order) of these relationships of notes result in the three remaining possible relationships of a combination divided by seven (seven letter names or seven scale or key signature degrees) Therefore, an inverted 2nd is a 7th, an inverted 3rd is a 6th, and an inverted 4th is a 5th. So there is now an accounted for: 2nd, 3rd, 4th, 5th, 6th, 7th. Then, to equate seven matching possibilities we would include the singular root which, if inverted, becomes its equal 8th or octave, so we therefore eliminate that redundancy of 1st and 8th. All of these intervals may be taught using this method. Linear cyclical presentationIn another embodiment of the invention, the cyclical intervals presented above may be shown in a linear fashion wherein the line continues from one side of a display to the other. In another embodiment of the invention, particular notes may be emphasized by either displacing them in space or time or indicating some other difference visually. In another embodiment of the invention, the cyclical intervals above may be shown in a circular fashion wherein either the circle moves or a pointer to the circle moves. In another embodiment of the invention, the letters may move, either horizontally, vertically, clockwise, counter-clockwise, or any combination of such movements.

Learning the Scales and Key Signatures Intuitively

There are several valid reasons why scales are ultimately necessary for advancement in a musical education. Each scale is defined by its tonal-center ("tonic") and named after that tonic letter name. Each tonal center ("key-signature") is unique in the number of sharps or flats it contains, and as well as which scale degrees need to become altered to sharps or flats in order to tonally match what the method refers to as the "master model." The "master model" of scales is that of "C-Major" which consists of all of the seven white keys. The musical terms used to describe a scale are somewhat synonymous when removed from their context. They are: scale ("diatonic"), "key of . . . " (not a single piano key, but the tonal center of a particular key), key-signature, etc.

A "scale" is the structure of notes built from a tonal center which can be replicated from the other tonal centers. The "diatonic scale" is the structure of ADJACENT notes which follows that description. The term "scale" is also used to refer to the physical execution of the notes it contains.

In the present method, scales are to be understood before they are practiced, in order to make that practice effective. Scales are quite often taught as the mere mastery of physical execution. As a motor skill muscle memory exercise to develop strength; independence of the fingers; and mainly the concept of utilizing the thumb as a "hinge." While this exercise is standard practice and valid, it is often not communicated to the student along with the information that makes it valid. Often a student will be confronted with scales from a quite early lesson, and forced to struggle with their execution for what may amount to years before they will be informed as to "why." The barrier in this approach is that explaining key centers can be very complex and tedious at a beginning piano lesson. This method proposes to solve that problem, as well as asserts that the process of teaching scale execution is at least as tedious as the musical theory that supports it. This method employs a unique approach to communicating both the standard fingering for execution, simultaneously with the student's comprehension of its supporting musical theory. In this way, the student will become engaged because they will explore and discover, armed with a musical and logical theory that they can use to understand things such as the diatonic scale. In doing so, this method defines and creates a structure by which one can increase their ability to play intuitively. This is obtainable by exploring through trial and error to refine one's ability to do so. Furthermore as the process of "defining" the "model" of which to replicate. Furthermore that "the starting note is the essential information" by which to carry out this process. Replicating the "model" from a different starting note is commonly known as "transposition." However, the process of "transposition" is as of yet not refined into an intuitive method. Rather transposition is typically taught as a mathematical replication of intervals, which is not intuitive. To accomplish this intuitive approach, this method begins by establishing the mental "model" at hand as the C-Major scale, which is the structure of the seven different white keys. However, the C-Major scale is not effectively musical enough for an early student to grasp by ear. It is not necessarily a memorable melody in and of itself. Therefore, this method employs as a device, the first phrase of the public domain melody of "Joy to the World" as its model. Regardless of culture this melody is heard often enough to recognize as it is a standard Christmas Carol. The method then provides the critical factor of the "starting note" which in the first case will be the note "C." Another embodiment of this invention helps a student deelop their ability to "play by ear" by "defining the model" which indicates whether or not the next note ascends or descends from the provided starting note. These two factors motivate the initial stages of what this method defines as the "Play by Ear" process. The fact that all of the consecutive notes in the first phrase of Joy to the World descend from each other is easily apparent to the student. If the descending sequence is not to obvious to the particular student, the method will refer them to another supplement within the entire method which the method refers to as the "Direction Connection." Assuming that the student will eventually recognize that each note in the model descends from the previous note, the phrase dictates a logical fingering in the process. This brings the student to the awareness of the need to plan fingerings to best execute the phrase. The method therefore assists this process by suggesting that since the notes are all descending, it is best to prepare all five fingers of the right hand. This naturally means the student will begin from the start note "C" using the pinky, and cascade down through the remaining four fingers that are left, to the left. The student will of course run out of fingers when they land on the thumb. Because the phrase consists of seven notes and then the note which completes the octave (eight notes), and having executed five of them, the student is prompted by the method to consider "how many notes are left to go?" It will thus become clear by using this method that there are three notes left to execute in order to complete the phrase. The method then instructs that "the completed phrase end on the thumb," which is natural. Thus as the method suggests to the student, "we need three more fingers, so cross your $3^{rd}$ (middle finger) over your thumb to complete the three remaining notes." By crossing the $3^{rd}$ finger over the thumb, the hand position is refreshed as the surrounding fingers naturally move into sequence over the remaining notes. This process then, becomes quite obvious, logical and natural to the student.

Yet, the student has now engaged with what is the established standard fingering for the "C Major scale." This somewhat solves the execution logic of scales without tremendous explanation and demonstration from the teacher. This is unique in that the method has intentionally chosen a melodic descending model rather than the traditional approach of the vaguely melodic ascending scale, and the typical struggle to teach the student how to cross the thumb under the fingers. Because the fingering that the student has now intuitively arrived at is that of the same configuration in reverse, when they are ultimately asked to "execute the same scale ascending with the traditional fingering". Meanwhile the student will have achieved the immediate gratification of performing the melody intuitively. Eventually the student will discover that in doing so, they are actually learning the scales, only in a descending fashion. Descending scales are equally demanding to ascending scales in tradition, however they are rarely, if ever, taught first. The more important thing that the student has then experienced is what a key-signature and its tonal center sounds like. In one embodiment of the invention, the method will then prompt the student to transpose the model to another starting note. In one embodiment of the invention the method might prompt the student to play "Joy to the World" (only the $1^{st}$ phrase) starting from G. The task which will necessarily follow is to play all of the notes that descend from the note G until landing on the lower octave G. This experience will guide the student to naturally employ the same fingerings that they applied when they were starting from C. As the student engages with the tune "Joy to the World", which has now begun to be effectively transposed to the "key of G", their innate ear will discover one discrepancy in matching the sound of the notes to the "model" which was essentially a descending C-Major scale. If the student doesn't immediately notice a "sour note" and attempt to correct it, the method will employ certain tactics to prompt the student's awareness of the discrepancy. In essence, the method will ask the student either directly or via the teacher that is utilizing the method, by asking "which is the 'broken' note?" In this case, there will always be only one ("broken note"). That "broken note" will invariably be the note "F." After the student is able to identify the note "F" as sounding "broken" (via the prompts and guidance the method provides if that appears necessary), then the method will prompt the student to "fix it." The concept of "fixing the broken note" is considered to be proprietary to this method, and is the impetus whereby any song can be learned by this process "by ear." There are very few nearby or adjacent options of notes surrounding the note "F," so that "fixing it" is a challenge of finding a nearby note to replace it with, until it sounds correct. Whether ultimately, or immediately through the process of elimination, the student will arrive at the answer, which is invariably "F#." This intuitive solution will naturally awaken the student to the gratification of solving the problem, but more importantly the epiphany that any musical (pitch oriented) problem can be solved in this way and that the student naturally possesses the tools and skills with which to solve it. In another embodiment of the invention, the student will be guided though each key in the logical order of key-centers. By prompting the student to now replicate the same activity from each tonic of those key centers. In doing so, they will discover that they encountered the F# in the last key and here they are encountering it again. And secondly that each of these key-centers are unique to each other because although each new key resembles the previous key, except for one unique sharp. An additional revelation occurs wherein the student realizes that each key retains the prior sharps, and acquires one new sharp. The method will next explore the key-center order counterclockwise from the Master Model center key of C-Major in order to contrast the "sharp yielding keys" with the "flat yielding keys" will be that of "F." This time all of the white-keys will be again "unbroken" but for one, which is in this case now a "flat." The note "B" will invariably sound sour to the common ear, and thus the solution will be to move the white key "B" "down" to its neighboring black-key (which means "flatted") in contrast to moving the sour note "up"(which means "sharped") as was the case in the "sharp yielding keys." Here it can be explained to the student via the method itself or the relaying teacher that if we are to continue in this counterclockwise direction, our listening ear will cause us to continually accumulate "flats" in the same way that we acquired "sharps" in the other "direction." With this understanding confirmed by the student, it is not always necessary to carry on through all of the "flat yielding keys" in order to demonstrate this fact, although it may be helpful. By running through the exercises described herein as part of this method, a music student will understand on an intuitive level the rarely taught and rarely understood issue of the true difference between sharps and flats. They will not only understand just the symbols for them, but they will understand how the ear naturally acquires them, and how a note is either sharped or flatted depending on the musical context. There is an understandable confusion pertaining to the black keys regarding why a black key may be referred to as either a "sharp" (raised from its neighbor) or a "flat" (lowered from its neighbor). This fact is known as "enharmonics." Unfortunately, "enharmonics" is an arduous thing to teach and learn. Because each black key has no name of its own, it may have one of two names when one of its neighboring white keys is either raised to it ("sharped") or the is lowered to it ("flatted"). At the end of all this instruction, the student will typically be left with an unanswered question: "when is a single black-key decidedly referred to as "Bb" (flat) as opposed to "A#" (sharp)?" This method provides a framework upon which this question may be solved by the student's own intuitive ear.

This method further includes a way to remember the answers to these questions and more which are referred to herein as "shape icons."

Shape Icons

In another aspect of this invention, a student is taught to quickly recognize each unique musical key by studying shapes which they can pair with the key signature as well as the shape that they need to keep their hand on a keyboard. These pairings allow a student to intuitively know which keys should be sharp or flat in each particular key. As an example, the basic shape is for the key-center of "C." This key always has no sharps and no flats. In this method, this is depicted as a level line. In contrast, the next key center in musical order is that of "G." The "key" of 'G' invariably has one, and only one, sharp. That one sharp is depicted in the method by an alteration of the previously mentioned C line with a point at the furthest right end indicating that there is a black note present in that key and where it is located on the keyboard. This is the intuitive conclusion that will become physically, subconsciously and aurally learned through application of this method. By use of this method, the shape icons intuitively tie together three more practical types of information that is immediately relevant to the performance of the piece at hand's key signature. Therefore, by applying this very simple and quickly intuitively grasped method, one can acquire the ability to assimilate the necessary information with which to perform a piece in any given key, at a glance.

In another embodiment of this aspect of the invention, instead of a line, any way of representing a binary set of data may used.

Subconscious Imprinting

As part of this method, a musical learning system is described which involves showing to a user in various chunks which can be modulated by a logical process. In response to what is shown to a student, a student will perform various tasks. In one embodiment of the invention, a user might press a button. In another embodiment, a user would play notes on an instrument. In another embodiment, an animation might activate itself based on a certain timing. In another embodiment, the speed of such animation would be slowly increased. In yet another embodiment of the invention, the phrases will increase in complexity as the user progresses so as to allow a user to train the scope of their peripheral vision to comprehend and understand increasing complex data content. In this way, a user will progress to where they are able to detect complete musical phrases, figures and relationships visually and instantly. With application to music reading, the device will further challenge the user by flashing simple to complex phrases in advance to when they are required to be performed, thus challenging the user to comprehend and read ahead. The device not only increases its challenge (and the student's skill level) in these ways, but it prepares the user by increasing peripheral vision and comprehension. Along with the support of the skills they have acquired to do this from other aspects of the method. With a chosen tempo the user is ultimately prepared to begin reading music in linear time ("rhythm"). By regulating tempos of the presented phrases the user will be challenged to execute them in a rhythmical pace. At this point they will be playing music. The content for such a learning system may include but isn't necessarily limited to the following: Actual musical notes on a staff beginning with singular pitches and increasing the strings of melodic notes up to flashes of complete musical phrases, which become increasingly complex. In addition, they would include harmony stacks known also as "chords" which can be displayed as such visually on the staff. Presented information can also include musical phrases and musical stanzas. In another embodiment of the invention, unique content that is part of the disclosed method such as displaying the letter cycles in duple and up to seven letter strings at increasing speeds. In another embodiment of the invention, shape icons are presented, challenging recall of their names, their number of sharps or flats, their names of those sharps or flats, and ultimately allow execution of the scales they uniquely represent. Furthermore, in another embodiment of the invention, while increasing visual capacity, the device will be paired with corresponding aural depictions of what is perceived. It should be noted that the disclosed techniques can be applied to any and all types of music teaching. In the foregoing specifications, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A teaching method comprising:
presenting, via a presentation medium, a conceptual model to a student, the conceptual model comprising a plurality of interactive activities to be performed by a student, wherein each of the interactive activities segments a keyboard into either a first chunk including two black keys and three white keys each being adjacent to one of the two black keys, or a second chunk including three black keys and four white keys each being adjacent to one of the three black keys;
performing a song associated with an interactive activity of the plurality of interactive activities, wherein the interactive activity in the presentation medium comprises lyrics and a melody using notes from at least one of the first chunk or the second chunk, and at least one of a picture analogy or a graphic portrayal that visually depicts spatial relations between the keys of the at least one of the first chunk or the second chunk in connection with the melody; and
instructing the student, by the teacher, to perform the interactive activity one or more times to increase at least one of speed or accuracy in identifying the three white keys by the two black keys in the first chunk and identifying the four white keys by the three black keys in the second chunk.

2. The teaching method of claim 1, wherein the notes from the first interactive activity comprises only the two blacks keys of the first chunk, only the three black keys of the second chunk, or only the two black keys of the first chunk and the three black keys of the second chunk.

3. The teaching method of claim 1, wherein the presentation medium is a display associated with a computer, and wherein presenting the conceptual model to the student comprises presenting the plurality of interactive activities on the display associated with the computer.

4. The teaching method of claim 1, wherein the presentation medium is a book, and wherein presenting the conceptual model to the student comprises presenting the plurality of interactive activities on one or more pages of the book.

5. The teaching method of claim 1, wherein the presentation medium is a display of a tablet, and wherein presenting the conceptual model to the student comprises presenting the plurality of interactive activities on the display.

6. The teaching method of claim 1, wherein the presentation medium is a display of a smart-phone, and wherein presenting the conceptual model to the student comprises presenting the plurality of interactive activities on the display.

7. The teaching method of claim 1, wherein the presentation medium is an audio device, and wherein presenting the conceptual model to the student comprises playing notes from the plurality of interactive activities on the audio device.

8. A teaching method comprising:
providing, by a teacher, a recognizable melody as a model melody comprising a particular relationship of tones for a student, the recognizable melody comprising a first starting note, a first key center, and an alphabetically arranged series of notes from the first starting note;
instructing the student, by the teacher, to perform the model melody;

instructing the student, by the teacher, to perform a second melody that is the model melody transposed to a different key center instigated by establishing a different starting note thus requiring one or more certain tones to be altered in order to replicate the model melody and it's particular relationship of tones and referring to the one or more certain tones that have therefore been altered as one or more broken tones, wherein the second melody comprises a second starting note, the different key center, and the alphabetically arranged series of notes from the second starting note, wherein the second starting note is a different key than the different key center;

instructing the student, by the teacher, to identify the one or more broken tones; and identifying, by the teacher, each of the one or more broken tones with their traditional altered name comprising a letter name and a corresponding sharp or flat depending on the second melody, wherein identifying each of the one or more broken tones with the traditional altered name in connection with the particular relationship of tones of the second melody and the different key center instructs the student how to apply the corresponding sharp or flat to the letter name according to the different key center while maintaining the alphabetically arranged series of notes from the second starting note.

9. The teaching method of claim 8, further comprising presenting, by the teacher via a presentation medium, notes of the model melody and the notes of the second melody.

10. A teaching method comprising:

assembling the official seven letter music alphabet in every conceivable order of letters into a plurality of pre-fabricated recital challenges of an alphabetically based system so as to facilitate rapid recall of every possible tonal organization as they are officially labeled by those seven letters by a student;

presenting the plurality of pre-fabricated recital challenges in the alphabetically based system for the student to memorize;

temporarily removing sharp or flat from the plurality of pre-fabricated recital challenges in order to cause intuitive rapid recall from the student based on the alphabetically based system.

11. The teaching method of claim 10, wherein assembling the official seven letter music alphabet in every conceivable order of letters into the plurality of pre-fabricated recital challenges of the alphabetically based system comprises assembling the plurality of pre-fabricated recital challenges as one or more displays of at least one of a computer, a tablet, or a smart-phone.

12. The teaching method of claim 10, wherein assembling the official seven letter music alphabet in every conceivable order of letters into the plurality of pre-fabricated recital challenges of the alphabetically based system comprises assembling the plurality of pre-fabricated recital challenges as one or more printed pages.

* * * * *